United States Patent
Ushida et al.

(10) Patent No.: US 12,272,935 B2
(45) Date of Patent: Apr. 8, 2025

(54) METHOD OF MANUFACTURING RECTANGULAR CONDUCTING WIRE

(71) Applicant: AISIN CORPORATION, Aichi (JP)

(72) Inventors: Hideharu Ushida, Kariya (JP); Michiharu Ikeda, Kariya (JP); Takaya Yamazaki, Kariya (JP); Hiroyuki Ono, Kariya (JP)

(73) Assignee: AISIN CORPORATION, Kariya (JP)

( * ) Notice: Subject to any disclaimer, the term of this patent is extended or adjusted under 35 U.S.C. 154(b) by 120 days.

(21) Appl. No.: 17/767,497

(22) PCT Filed: Dec. 25, 2020

(86) PCT No.: PCT/JP2020/049012
§ 371 (c)(1),
(2) Date: Apr. 8, 2022

(87) PCT Pub. No.: WO2021/132677
PCT Pub. Date: Jul. 1, 2021

(65) Prior Publication Data
US 2024/0079862 A1    Mar. 7, 2024

(30) Foreign Application Priority Data
Dec. 25, 2019   (JP) .................. 2019-234306

(51) Int. Cl.
*H02G 1/12*    (2006.01)
(52) U.S. Cl.
CPC ........ *H02G 1/128* (2013.01); *Y10T 29/49117* (2015.01)

(58) Field of Classification Search
CPC ........ H02G 1/128; H02G 1/12; H01B 13/003; Y10T 29/49117
USPC .......................... 29/825, 850, 868
See application file for complete search history.

(56) References Cited

U.S. PATENT DOCUMENTS

| | | | |
|---|---|---|---|
| 10,958,048 B2 * | 3/2021 | Saito ................ | H02G 1/005 |
| 11,018,482 B2 * | 5/2021 | Oka .................. | H02G 1/1285 |
| 11,063,500 B2 | 7/2021 | Ponzio et al. | |
| 11,502,587 B2 | 11/2022 | Ponzio et al. | |
| 2019/0280577 A1 | 9/2019 | Ponzio et al. | |
| 2021/0296972 A1 | 9/2021 | Ponzio et al. | |

FOREIGN PATENT DOCUMENTS

| | | |
|---|---|---|
| JP | 2004-72860 A | 3/2004 |
| JP | 2012-70483 A | 4/2012 |
| WO | 2018/092022 A1 | 5/2018 |

OTHER PUBLICATIONS

Mar. 16, 2021 International Search Report issued in International Patent Application No. PCT/JP2020/049012.

* cited by examiner

*Primary Examiner* — Thiem D Phan
(74) *Attorney, Agent, or Firm* — Oliff PLC

(57) ABSTRACT

A method of manufacturing a rectangular conducting wire wherein insulating coating of rectangular conducting wire is removed by applying laser light the insulating coating, four planar portions on exterior of rectangular conducting wire are sequentially defined as a first, second, third, and fourth face portion, second corner portion is defined between second and third face portions, and fourth corner portion is defined between fourth and first face portions.

17 Claims, 22 Drawing Sheets

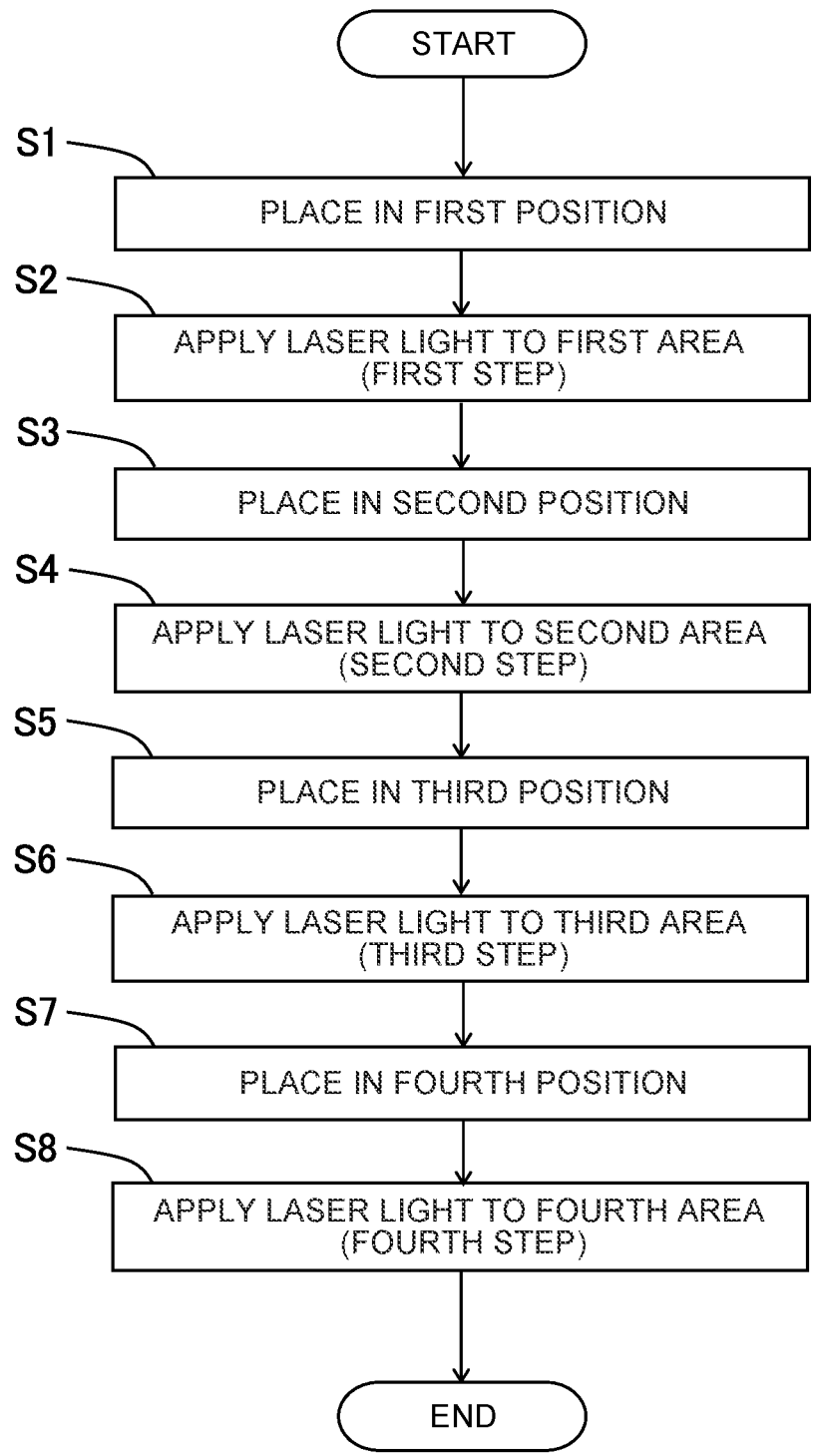

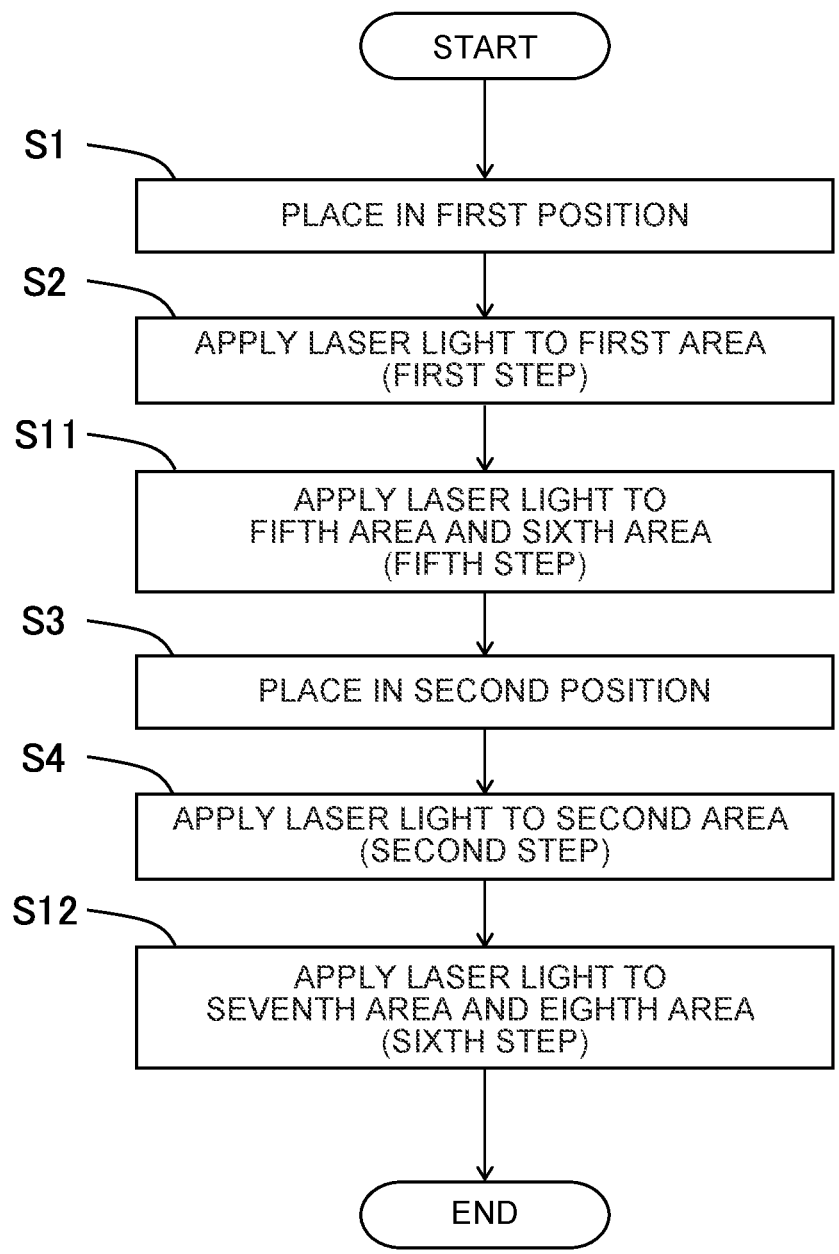

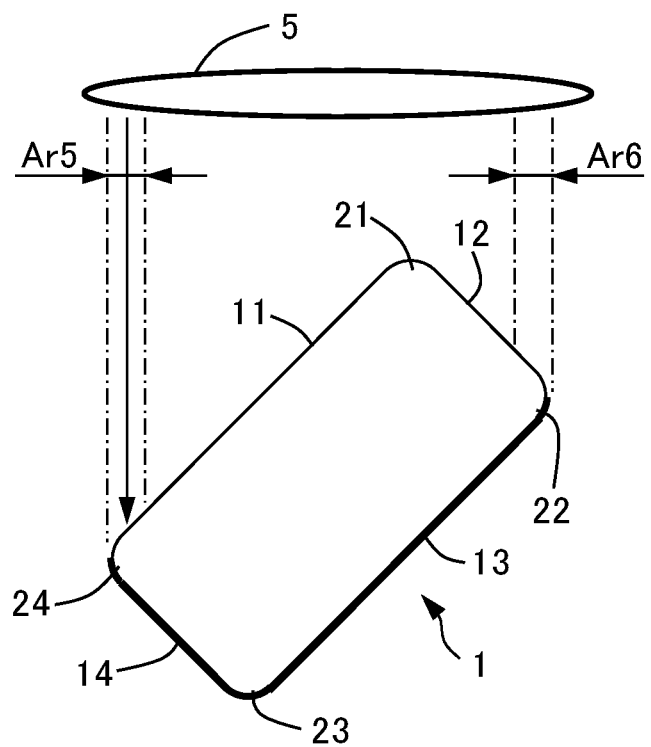

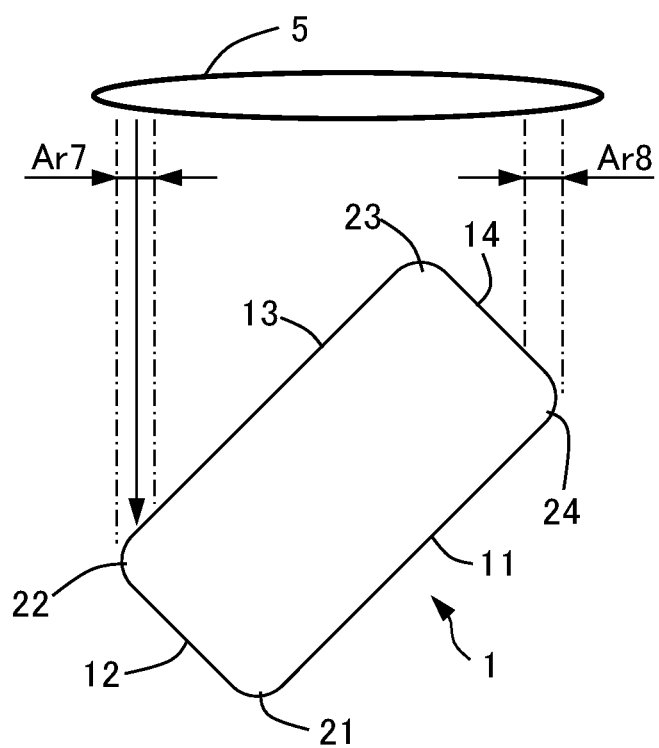

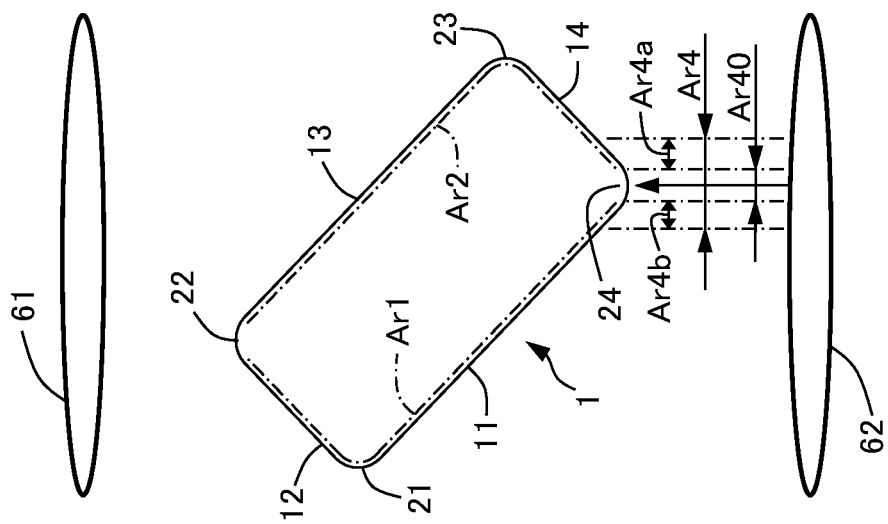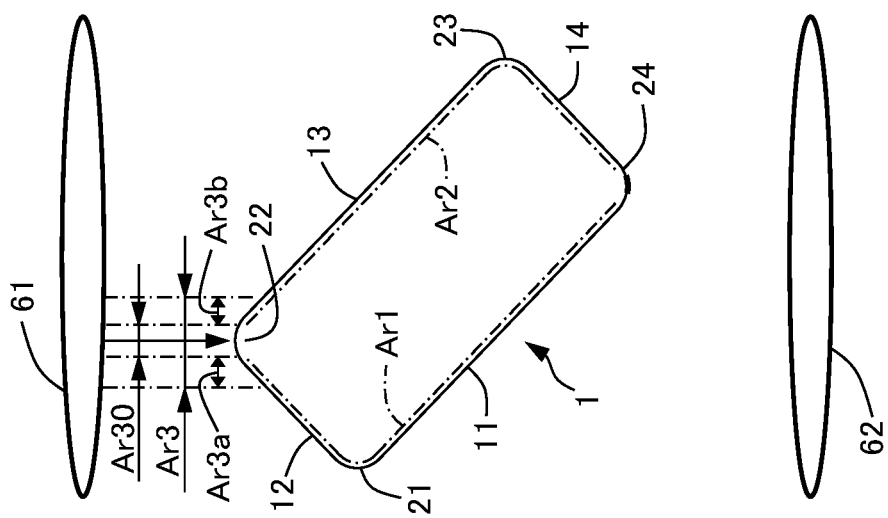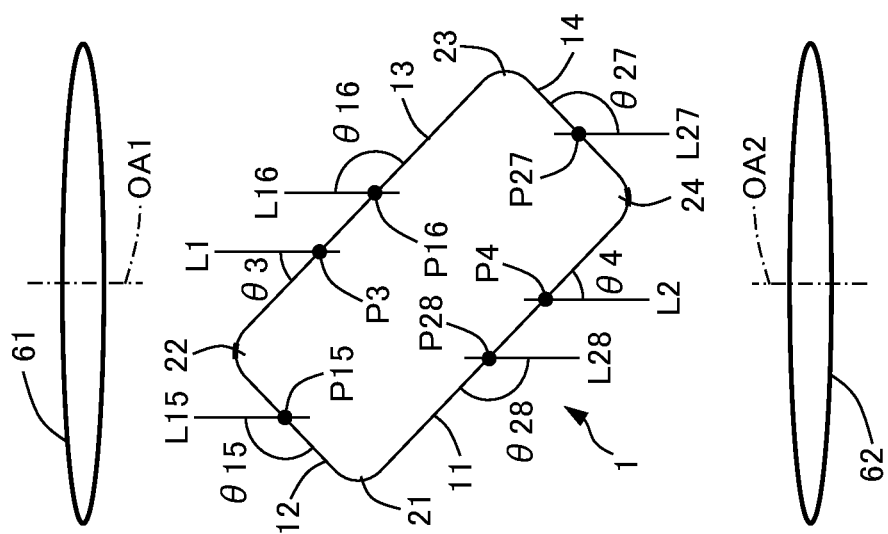

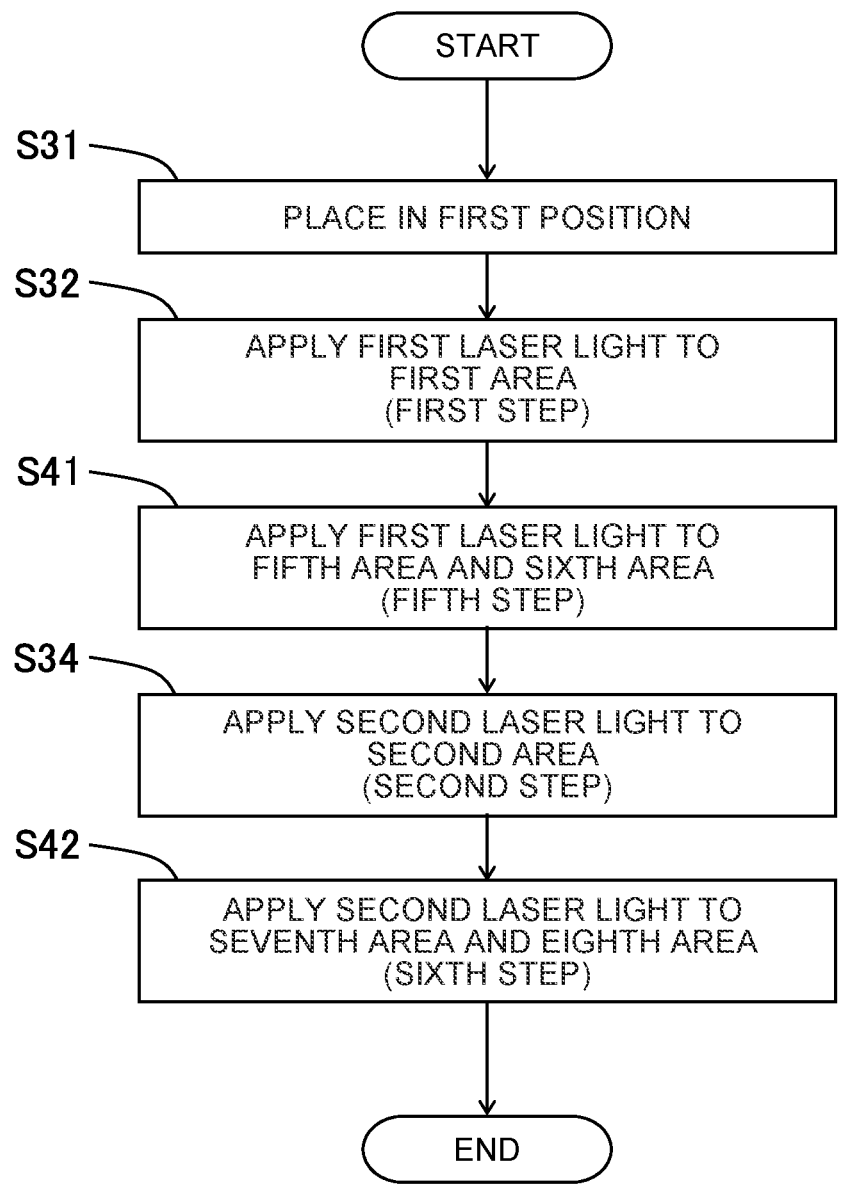

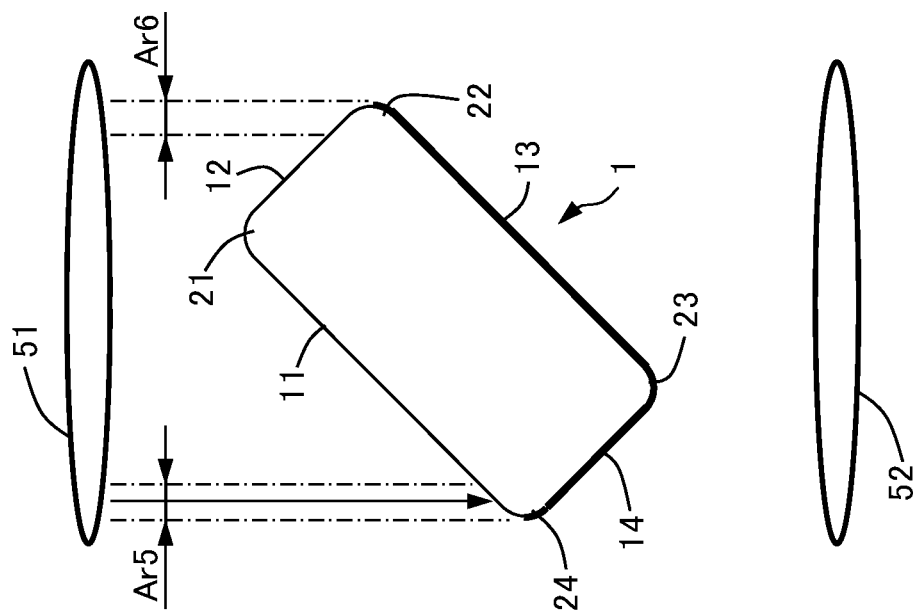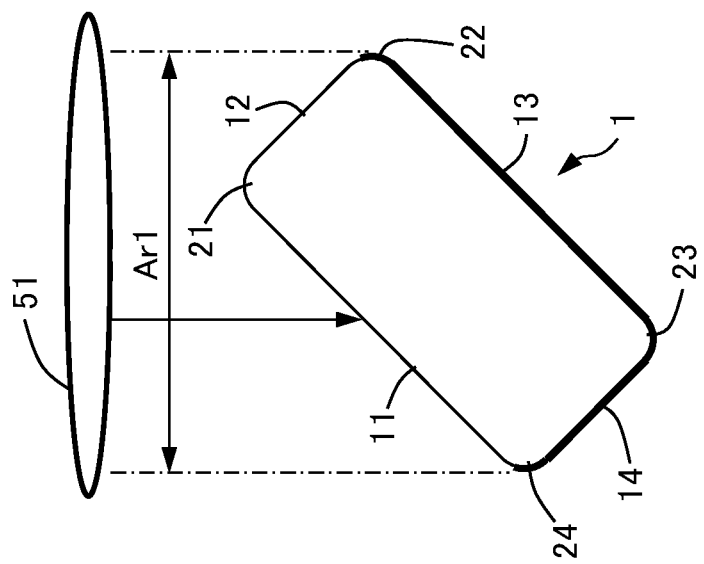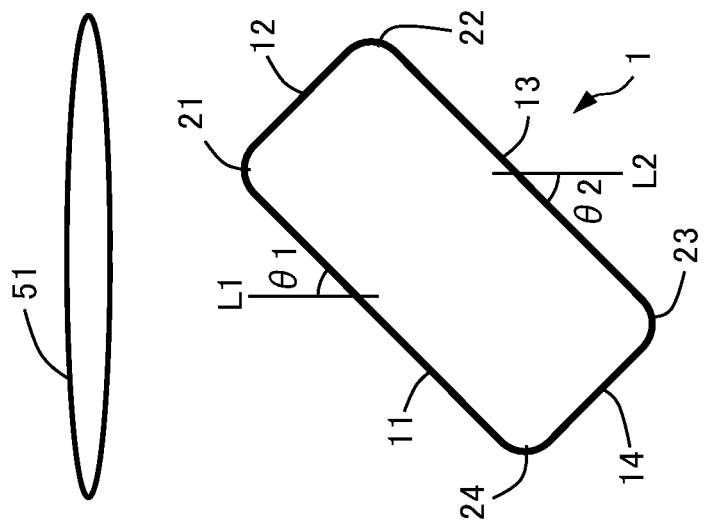

METHOD OF MANUFACTURING RECTANGULAR CONDUCTING WIRE

TECHNICAL FIELD

This technology relates to a method of manufacturing a rectangular conducting wire by application of laser light.

BACKGROUND ART

A rectangular conducting wire having an insulating coating formed on the surface thereof is widely used as a conducting wire that is wound on a stator core or the like used for an electric motor or the like that is mounted on a vehicle, such as an electric car. To use such a rectangular conducting wire, it is necessary to expose a core at an electrically connecting portion by removing an insulating coating thereon. For this reason, an operation that removes the insulating coating of the connecting portion of the rectangular conducting wire is performed.

In a method conventionally used as a method of removing an insulating coating of a rectangular conducting wire, that is, as a method of manufacturing a rectangular conducting wire, laser light is applied individually to each of four face portions of the rectangular conducting wire to perform the removal, and then additional laser light is applied to the insulating coating left on four corner portions two by two on the same face portion. However, since this removal method requires four steps to apply laser light individually to each of the four face portions and also requires additional two steps to apply laser light to the corner portions two by two on the same face thereafter, six steps are required in total. In contract to this, there is a developed removal method in which paint for absorbing laser light is applied to four corner portions of a rectangular conducting wire beforehand to reduce the number of steps (refer to Patent Document 1). According to this removal method, laser light is absorbed by the corner portions, so that the amount of heat tends to increase. Therefore, by only four steps that apply laser light individually to four face portions, the amount of heat at each corner portion increases to facilitate removal of an insulating coating of each corner portion.

RELATED ART DOCUMENTS

Patent Documents

Patent Document 1: Japanese Patent Application Publication No. 2012-70483 (JP 2012-70483 A)

SUMMARY OF THE DISCLOSURE

Problem to be Solved by the Disclosure

However, since the method of manufacturing a rectangular conducting wire disclosed in Patent Document 1 requires that paint for absorbing laser light be applied before laser light is applied to the rectangular conducting wire, there is a desire to reduce operations to apply the paint and the cost of the paint.

Therefore, a propose is to provide a method of manufacturing a rectangular conducting wire that is capable of reducing the number of steps and eliminating the need of an additional step, such as application of paint.

Means for Solving the Problem

This method of manufacturing a rectangular conducting wire is a method of manufacturing a rectangular conducting wire in which an insulating coating of the rectangular conducting wire is removed by applying laser light to the insulating coating, wherein four planar portions on an exterior of the rectangular conducting wire are defined in adjacent order of arrangement as a first face portion, a second face portion, a third face portion, and a fourth face portion, a corner portion between the first face portion and the second face portion is defined as a first corner portion, a corner portion between the second face portion and the third face portion is defined as a second corner portion, a corner portion between the third face portion and the fourth face portion is defined as a third corner portion, and a corner portion between the fourth face portion and the first face portion is defined as a fourth corner portion. This method is provided with a first step of applying the laser light to a first area including the first face portion, the first corner portion, and the second face portion, with the rectangular conducting wire placed in a first position where the first face portion and the second face portion face an application unit for applying the laser light, where an angle formed at an intersection point of a straight line parallel to an optical axis of the laser light with the first face portion toward the fourth corner portion is an obtuse angle, and where an angle formed at an intersection point of a straight line parallel to the optical axis with the second face portion toward the second corner portion is an obtuse angle.

Effects of the Disclosure

This method of manufacturing a rectangular conducting wire is capable of reducing the number of steps and eliminating the need of an additional step, such as application of paint.

BRIEF DESCRIPTION OF THE DRAWINGS

FIG. 2 is a flowchart illustrating a method of manufacturing the rectangular conducting wire according to the first embodiment.

FIG. 5 is a flowchart illustrating a method of manufacturing a rectangular conducting wire according to a second embodiment.

FIG. 6C is a simplified cross-sectional view of the rectangular conducting wire while laser light is being applied in the first position to a fifth area and to a sixth area in a fifth step of the method of manufacturing the rectangular conducting wire according to the second embodiment.

FIG. 7C is a simplified cross-sectional view of the rectangular conducting wire while laser light is being applied in the second position to a seventh area and to an eighth area in a sixth step of the method of manufacturing the rectangular conducting wire according to the second embodiment.

FIG. 12A is a simplified cross-sectional view of the rectangular conducting wire placed in a third position in the method of manufacturing the rectangular conducting wire according to the fourth embodiment.

FIG. 12B is a simplified cross-sectional view of the rectangular conducting wire while the first laser light is being applied to a third area in a third step of the method of manufacturing the rectangular conducting wire according to the fourth embodiment.

FIG. 12C is a simplified cross-sectional view of the rectangular conducting wire while the second laser light is being applied to a fourth area in a fourth step of the method of manufacturing the rectangular conducting wire according to the fourth embodiment.

FIG. 13 is a flowchart illustrating a method of manufacturing a rectangular conducting wire according to a fifth embodiment.

FIG. 14A is a simplified cross-sectional view of the rectangular conducting wire placed in a first position in the method of manufacturing the rectangular conducting wire according to the fifth embodiment.

FIG. 14B is a simplified cross-sectional view of the rectangular conducting wire while first laser light is being applied to a first area in a first step of the method of manufacturing the rectangular conducting wire according to the fifth embodiment.

FIG. 14C is a simplified cross-sectional view of the rectangular conducting wire while the first laser light is being applied to a fifth area and to a sixth area in a fifth step of the method of manufacturing the rectangular conducting wire according to the fifth embodiment.

MODES FOR CARRYING OUT THE DISCLOSURE

First Embodiment

A first embodiment of a method of manufacturing a rectangular conducting wire according to the present disclosure is described below with reference to FIG. 1 to FIG. 4D. According to the present embodiment, the rectangular conducting wire is a conducting wire that is used as a coil to be wound on a stator core of an electric motor.

[Structure of Rectangular Conducting Wire]

Figure 1:
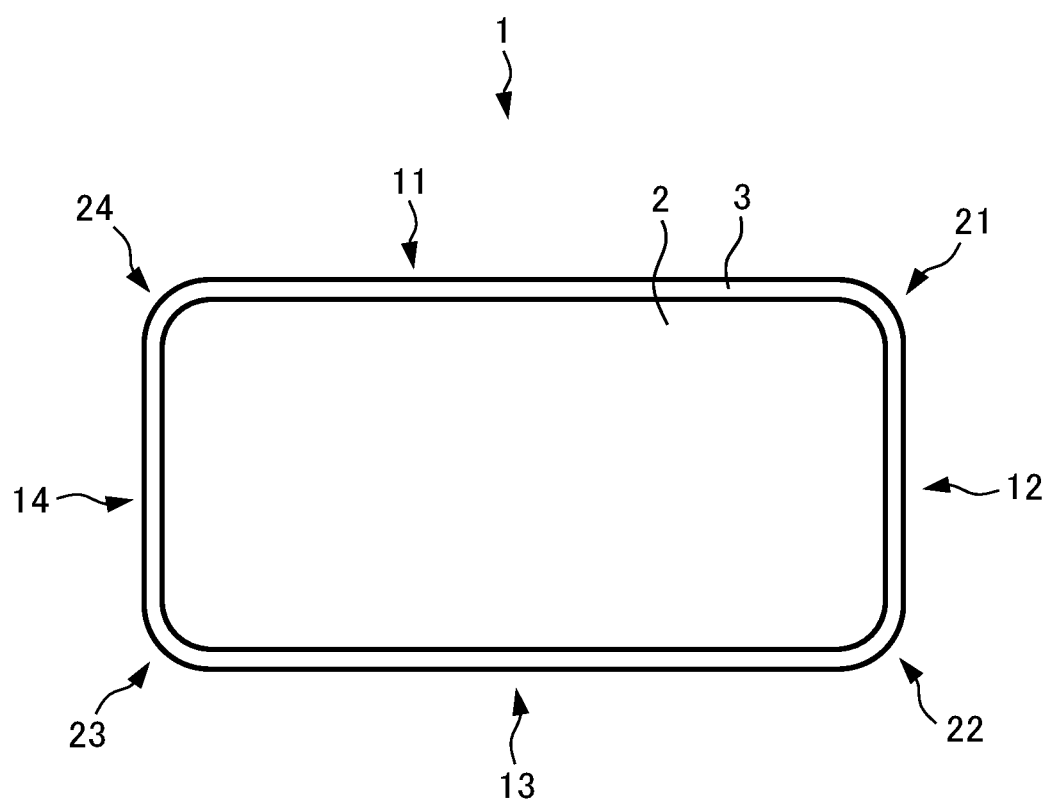
FIG. 1 is a cross-sectional view illustrating a rectangular conducting wire according to a first embodiment.

First, referring to FIG. 1, the structure of a rectangular conducting wire 1 is described. The rectangular conducting wire 1 is a conducting wire having a rectangular cross-section and is structured by forming an insulating coating 3, such as an enamel coating, on the surface of a core 2. The rectangular conducting wire 1 has four planar portions on an exterior thereof. The planar portions are defined in adjacent order of arrangement as a first face portion 11, a second face portion 12, a third face portion 13, and a fourth face portion 14. Further, a corner portion between the first face portion 11 and the second face portion 12 is defined as a first corner portion 21, a corner portion between the second face portion 12 and the third face portion 13 is defined as a second corner portion 22, a corner portion between the third face portion 13 and the fourth face portion 14 is defined as a third corner portion 23, and a corner portion between the fourth face portion 14 and the first face portion 11 is defined as a fourth corner portion 24. According to the present embodiment, each of the corner portions 21 to 24 has an arc-shaped cross section. Although the present embodiment illustrates that each of the corner portions 21 to 24 is rounded to have an arc-shaped cross section, this is not limiting. For example, each of the corner portions 21 to 24 may be chamfered to have a straight-line-shaped cross section.

In order to use the rectangular conducting wire 1 by winding the rectangular conducting wire 1 on a stator core, a core 2 is exposed at an electrically connecting portion, for example, at an end portion by removing the insulating coating 3 thereon. Thus, a removal portion where the insulating coating 3 is removed by application of laser light is formed at the connecting portion of the rectangular conducting wire 1. Laser light that is used to form the removal portion is not limiting, and for example, a green laser, a $CO_2$ laser, or a YAG laser may be used. According to the present embodiment, a laser application device capable of applying laser light from an application unit is used to apply laser light to a portion, where the removal portion is to be formed, of the rectangular conducting wire 1 that is placed as an object to which laser light is to be applied. The specifications of laser light used as an example in the present embodiment are as follows. Laser diameter: diameter, 0.06 mm; pulse energy: 1 mJ; frequency: 300 KHz; pulse width: 240 nsec; pitch width: feed direction, 0.03 mm; line offset distance: 0.06 mm. Further, the focal length of the laser light is not limiting and may be, for example, a location that is offset toward the core 2 from the topmost point (the shortest distance) of the rectangular conducting wire 1 that is inclined. Further, in FIG. 3A to FIG. 4D that are described later, application units 5 and 6 of the laser application devices are illustrated as fθ lenses for the sake of brevity, but actually represent the entire application units.

[Method of Manufacturing Rectangular Conducting Wire]

A method of manufacturing the rectangular conducting wire 1 according to the present embodiment is described below with reference to a flowchart illustrated in FIG. 2 and process charts illustrated in FIG. 3A to FIG. 4D. It is noted that in FIG. 3A to FIG. 4D, an insulating coating is represented by a thick continuous line, and laser light is represented by an arrow.

Figure 3A:
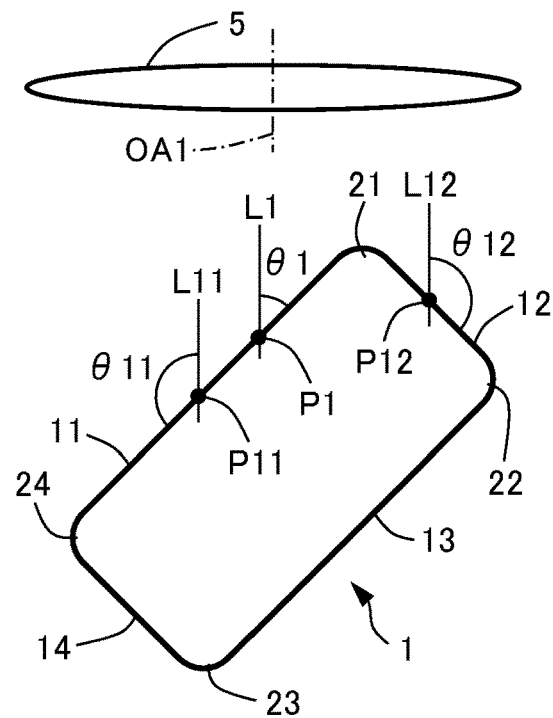
FIG. 3A is a simplified cross-sectional view of the rectangular conducting wire placed in a first position in the method of manufacturing the rectangular conducting wire according to the first embodiment.

First, as illustrated in FIG. 3A, the rectangular conducting wire 1 is placed on the laser application device in a first position (step S1). The first position according to the present embodiment is a position in which the first face portion 11 and the second face portion 12 face an application unit 5 for applying laser light and are diagonal with respect to an optical axis OA1 of the laser light. The optical axis OA1 here means the optical axis OA1 related to the applied laser light. That is, the first position is a position in which an angle θ11 formed at an intersection point P11 of a straight line L11 parallel to the optical axis OA1 with the first face portion 11 toward the fourth corner portion 24 is an obtuse angle, and in which an angle θ12 formed at an intersection point P12 of a straight line L12 parallel to the optical axis OA1 with the second face portion 12 toward the second corner portion 22 is an obtuse angle.

According to the present embodiment, in the first position, an angle θ1 formed at an intersection point P1 of a straight line L1 parallel to the direction of the optical axis OA1 with each of the first face portion 11 and the second face portion 12 toward the first corner portion 21 is 45°. That is, the rectangular conducting wire 1 is placed such that θ11=θ12=135°.

Figure 3B:
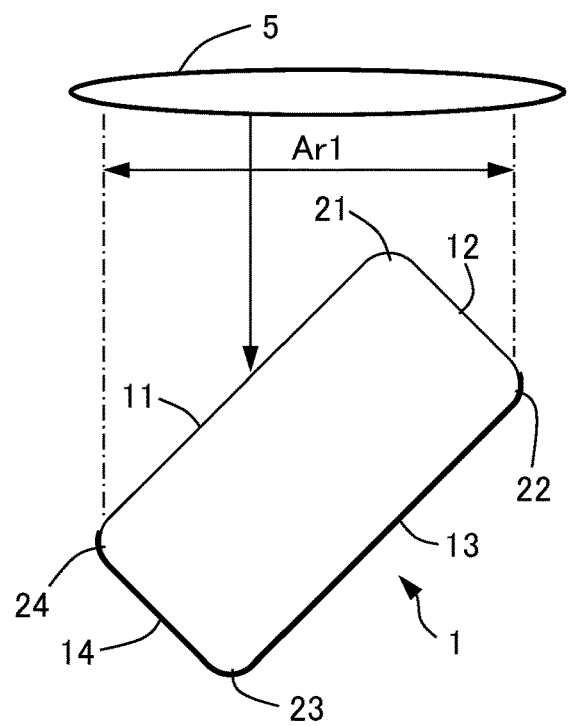
FIG. 3B is a simplified cross-sectional view of the rectangular conducting wire while laser light is being applied to a first area in a first step of the method of manufacturing the rectangular conducting wire according to the first embodiment.

As illustrated in FIG. 3B, the laser light is applied to a first area Ar1 (step S2, a first step). According to the present embodiment, the first area Ar1 is an area covering the first face portion 11, the first corner portion 21, and the second face portion 12. With a line offset distance of 0.06 mm, the laser is applied in both directions alternately. This allows the three portions, namely, the first face portion 11, the first corner portion 21, and the second face portion 12 to be irradiated in one step. Thus, it is possible to reduce the number of steps, for example, as compared with when the first face portion 11 and the second face portion 12 are irradiated in separate two steps.

Figure 3C:
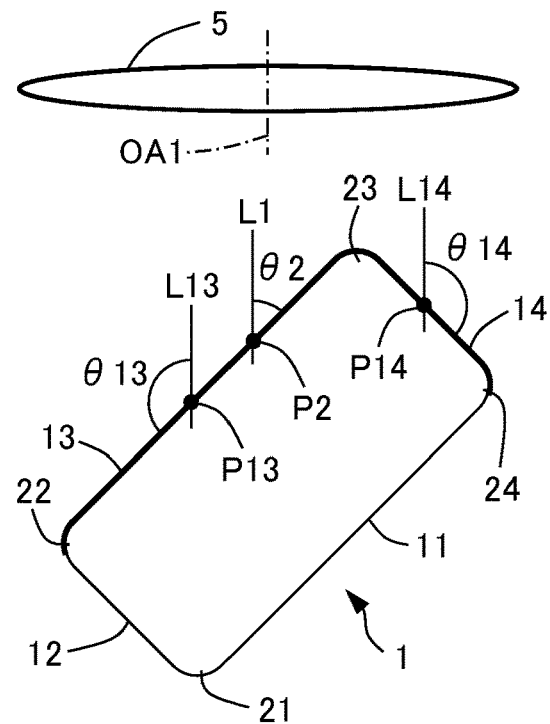
FIG. 3C is a simplified cross-sectional view of the rectangular conducting wire placed in a second position in the method of manufacturing the rectangular conducting wire according to the first embodiment.

As illustrated in FIG. 3C, the rectangular conducting wire 1 is rotated by 180° from the first position and is thereby placed on the laser application device in a second position (step S3). The second position according to the present embodiment is a position in which the third face portion 13 and the fourth face portion 14 face the application unit 5 for the laser light and are diagonal with respect to the optical axis OA1 of the laser light. That is, the second position is a position in which an angle θ13 formed at an intersection point P13 of a straight line L13 parallel to the optical axis OA1 with the third face portion 13 toward the second corner portion 22 is an obtuse angle, and in which an angle θ14 formed at an intersection point P14 of a straight line L14 parallel to the optical axis OA1 with the fourth face portion 14 toward the fourth corner portion 24 is an obtuse angle. According to the present embodiment, in the second position, an angle θ2 formed at an intersection point P2 of the straight line L1 parallel to the direction of the optical axis OA1 with each of the third face portion 13 and the fourth face portion 14 toward the third corner portion 23 is 45°. That is, the rectangular conducting wire 1 is placed such that θ13=θ14=135°.

Figure 3D:
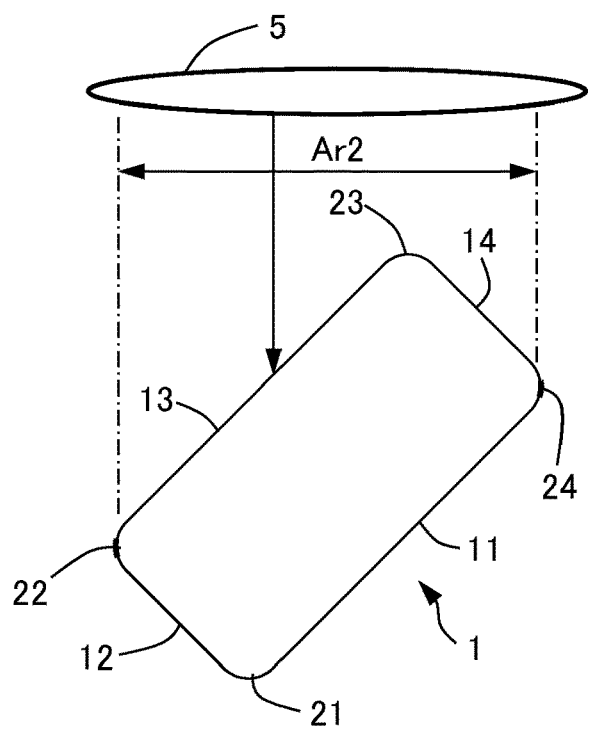
FIG. 3D is a simplified cross-sectional view of the rectangular conducting wire while laser light is being applied to a second area in a second step of the method of manufacturing the rectangular conducting wire according to the first embodiment.

As illustrated in FIG. 3D, the laser light is applied to a second area Ar2 (step S4, a second step). According to the present embodiment, the second area Ar2 is an area covering the third face portion 13, the third corner portion 23, and the fourth face portion 14. This allows the three portions, namely, the third face portion 13, the third corner portion 23, and the fourth face portion 14 to be irradiated in one step. Thus, it is possible to reduce the number of steps, for example, as compared with when the third face portion 13 and the fourth face portion 14 are irradiated in separate two steps.

The first step and the second step described above allow application of laser light to the first face portion 11, the second face portion 12, the third face portion 13, and the fourth face portion 14 around the entire perimeter of the rectangular conducting wire 1, thus permitting removal of the insulating coating 3 (refer to FIG. 1) on almost the entire perimeter. However, since each corner portion is arc-shaped in cross section, and a vertex of each of the second corner portion 22 and the fourth corner portion 24 is irradiated with laser light from the side, there is a possibility that a slight amount of the insulating coating may be left on the vertex of each of the second corner portion 22 and the fourth corner portion 24. For this reason, according to the present embodiment, after the first step and the second step are performed, laser light is further applied to each of the second corner portion 22 and the fourth corner portion 24 from the vertex side thereof.

Since this is performed to remove the insulating coating that may be left on the vertexes of the second corner portion 22 and the fourth corner portion 24, the removal is possible by laser light that is lower in power than that used in the first step and the second step. Therefore, according to the present embodiment, after the second step is finished, the rectangular conducting wire 1 is unplaced from the laser application device and is then placed on another low-power laser application device to perform steps described below.

Figure 4A:
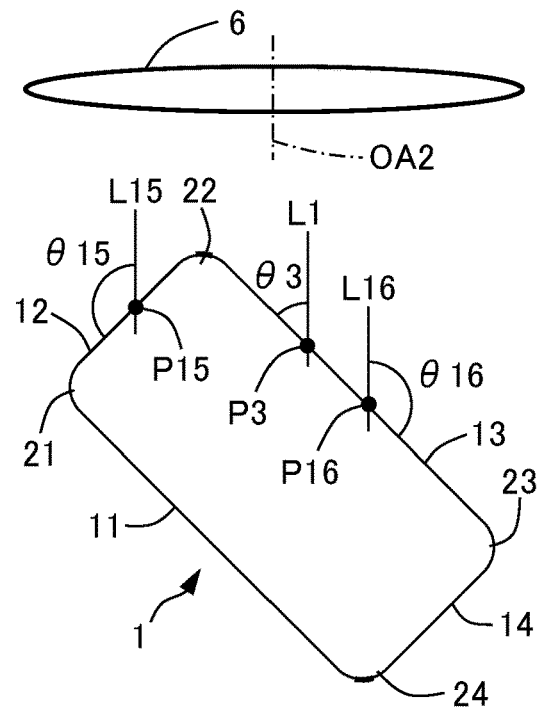
FIG. 4A is a simplified cross-sectional view of the rectangular conducting wire placed in a third position in the method of manufacturing the rectangular conducting wire according to the first embodiment.

After the second step is finished, as illustrated in FIG. 4A, the rectangular conducting wire 1 is placed on a low-power laser device in a third position that is rotated by 90° from the second position (step S5). The third position according to the present embodiment is a position in which the second corner portion 22 faces an application unit 6 for applying laser light and is diagonal with respect to an optical axis OA2 of the laser light. That is, the third position is a position in which an angle θ15 formed at an intersection point P15 of a straight line L15 parallel to the optical axis OA2 with the second face portion 12 toward the first corner portion 21 is an obtuse angle, and in which an angle θ16 formed at an intersection point P16 of a straight line L16 parallel to the optical axis OA2 with the third face portion 13 toward the third corner portion 23 is an obtuse angle. According to the present embodiment, in the third position, an angle θ3 formed at an intersection point P3 of the straight line L1 parallel to the direction of the optical axis OA2 with each of the second face portion 12 and the third face portion 13 toward the second corner portion 22 is 45°. That is, the rectangular conducting wire 1 is placed such that θ15=θ16=135°.

Figure 4B:
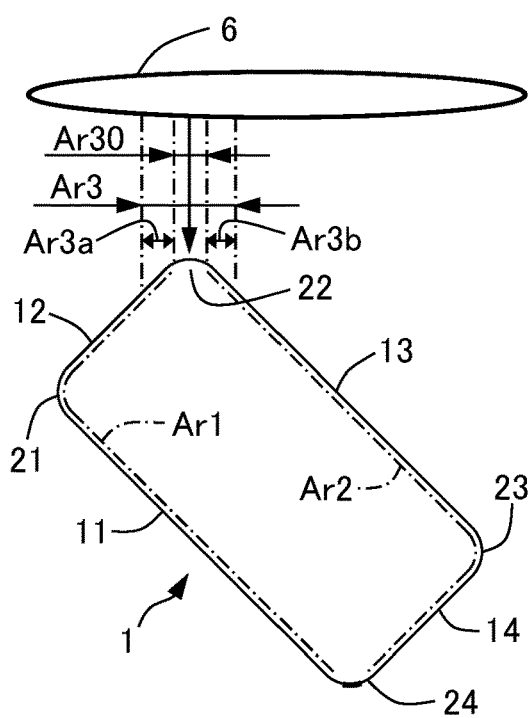
FIG. 4B is a simplified cross-sectional view of the rectangular conducting wire while laser light is being applied to a third area in a third step of the method of manufacturing the rectangular conducting wire according to the first embodiment.

As illustrated in FIG. 4B, the laser light is applied to a third area Ar3 (step S6, a third step). According to the present embodiment, the third area Ar3 is an area including the second corner portion 22, and a portion Ar3a of the third area Ar3 overlaps an end portion of the first area Ar1 while another portion Ar3b of the third area Ar3 overlaps an end portion of the second area Ar2. The laser light that is applied to the third area Ar3 in the third step is lower in power than the laser light that is applied to the first area Ar1 in the first step.

Figure 4C:
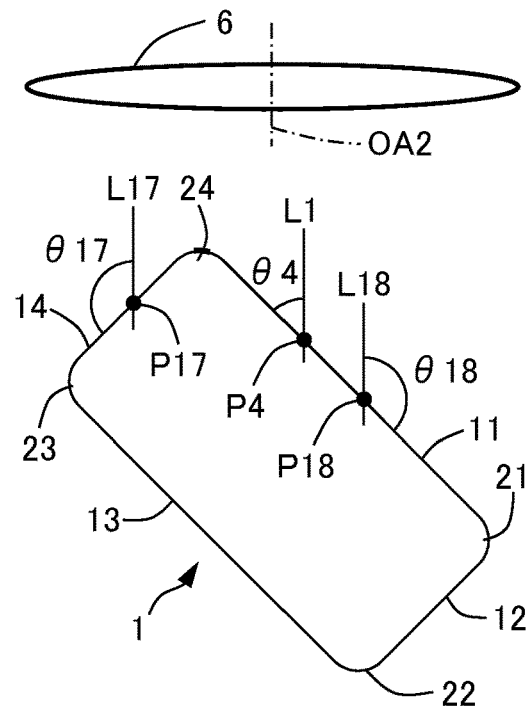
FIG. 4C is a simplified cross-sectional view of the rectangular conducting wire placed in a fourth position in the method of manufacturing the rectangular conducting wire according to the first embodiment.

As illustrated in FIG. 4C, the rectangular conducting wire 1 is rotated by 180° from the third position and is thereby placed on the laser application device in a fourth position (step S7). The fourth position according to the present embodiment is a position in which the fourth corner portion 24 faces the application unit 6 for applying the laser light and is diagonal with respect to the optical axis OA2 of the laser light. That is, the fourth position is a position in which an angle θ17 formed at an intersection point P17 of a straight line L17 parallel to the optical axis OA2 with the fourth face portion 14 toward the third corner portion 23 is an obtuse angle, and in which an angle θ18 formed at an intersection point P18 of a straight line L18 parallel to the optical axis OA2 with the first face portion 11 toward the first corner portion 21 is an obtuse angle. According to the present embodiment, in the fourth position, an angle θ4 formed at an intersection point P4 of the straight line L1 parallel to the direction of the optical axis OA2 with each of the fourth face portion 14 and the first face portion 11 toward the fourth corner portion 24 is 45°. That is, the rectangular conducting wire 1 is placed such that θ17=θ18=135°.

Figure 4D:
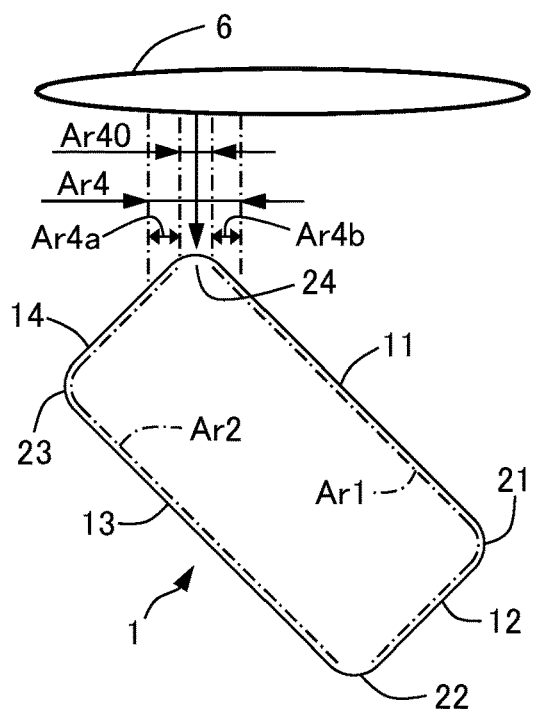
FIG. 4D is a simplified cross-sectional view of the rectangular conducting wire while laser light is being applied to a fourth area in a fourth step of the method of manufacturing the rectangular conducting wire according to the first embodiment.

As illustrated in FIG. 4D, the laser light is applied to a fourth area Ar4 (step S8, a fourth step). According to the present embodiment, the fourth area Ar4 is an area including the fourth corner portion 24, and a portion Ar4a of the fourth area Ar4 overlaps an end portion of the second area Ar2 while another portion Ar4b of the fourth area Ar4 overlaps an end portion of the first area Ar1. The laser light that is applied to the fourth area Ar4 in the fourth step is lower in power than the laser light that is applied to the first area Ar1 in the first step.

By performing the first to fourth steps described above, it is possible to apply the laser light to the rectangular conducting wire 1 having the insulating coating 3 (refer to FIG. 1) formed on the surface thereof and thus to remove the insulating coating 3.

As described above, the method of manufacturing the rectangular conducting wire 1 according to the present embodiment applies laser light in the first position. This allows two adjacent planar portions and one corner portion therebetween to be irradiated in a single step of applying laser light that is performed with the rectangular conducting wire 1 fixed. Thus, in order to reduce the number of steps, it is unnecessary to apply paint for absorption to the corner portions of the rectangular conducting wire 1 before application of laser light. Therefore, it is possible to reduce the number of steps and to eliminate the need of an additional step, such as application of paint.

Further, the method of manufacturing the rectangular conducting wire 1 according to the present embodiment applies the laser light in the second position, after applying the laser light in the first position. The application of laser light in the second position also allows two adjacent planar portions and one corner portion therebetween to be irradiated in a single step of applying laser light that is performed with the rectangular conducting wire 1 fixed. Thus, an operation that applies the laser light around the entire perimeter of the rectangular conducting wire 1 is achievable in as little as two steps.

Further, the method of manufacturing the rectangular conducting wire 1 according to the present embodiment performs the third step and the fourth step after performing the first step and the second step, thereby applying laser light to the second corner portion 22 and to the fourth corner portion 24. Thus, even when a slight amount of the insulating coating is left on the vertex of each of the second corner portion 22 and the fourth corner portion 24 because of the arc-shaped cross section of each corner portion, it is possible to reduce the occurrence of insulating coating residues. Further, the laser light that is used at that time can be lower in power than the laser light that is used in the first step and the second step. Therefore, it is possible that a production line for the first step and the second step is separate from a production line for the third step and the fourth step, that the production line for the first step and the second step uses a high-power laser application device, and that the production line for the third step and the fourth step uses a low-power laser application device. Thus, it is possible to reduce the production time and to reduce an increase in the cost as compared with when the production line for the third step and the fourth step uses a high-power laser application device.

Further, in the method of manufacturing the rectangular conducting wire 1 according to the present embodiment, the third area Ar3, to which the laser light is applied in the third step, has the portion Ar3a overlapping the end portion of the first area Ar1 and has the other portion Ar3b overlapping the end portion of the second area Ar2. In addition, the fourth area Ar4, to which the laser light is applied in the fourth step, has the portion Ar4a overlapping the end portion of the second area Ar2 and has the other portion Ar4b overlapping the end portion of the first area Ar1. This ensures thorough application of laser light in each of a boundary portion between the first area Ar1 and the third area Ar3, a boundary portion between the third area Ar3 and the second area Ar2, a boundary portion between the second area Ar2 and the fourth area Ar4, and a boundary portion between the fourth area Ar4 and the first area Ar1. Therefore, highly accurate removal of the insulating coating 3 is possible.

Although the present embodiment described above illustrates that the production line for the first step and the second step is separate from the production line for the third step and the fourth step, this is not limiting. For example, the first step and the second step, and the third step and the fourth step may be performed on a single continuous production line, and also in this case, it is possible to reduce the occurrence of insulating coating residues. This case eliminates the need to remount the rectangular conducting wire 1 to another laser application device, thus allowing improvement in workability. Further, even in this case, power of the laser light in the third step and the fourth step can be lower than power of the laser light in the first step and the second step.

Further, although the present embodiment illustrates that the third step and the fourth step are performed after the first step and the second step are performed, this is not limiting. The first step and the second step may be performed after the third step and the fourth step are performed. Further, the third step and the fourth step may be omitted when the first step and the second step alone are capable of reducing the occurrence of insulating coating residues, such as when each corner portion is shaped to have a right-angled cross-section.

Further, although the present embodiment illustrates that the first area Ar1 is an area covering the first face portion 11, the first corner portion 21, and the second face portion 12, this is not limiting. For example, the first area Ar1 may be an area covering the fourth corner portion 24, the first face portion 11, the first corner portion 21, the second face portion 12, and the second corner portion 22. Further, although the present embodiment illustrates that the second area Ar2 is an area covering the third face portion 13, the third corner portion 23, and the fourth face portion 14, this is not limiting. For example, the second area Ar2 may be an area covering the second corner portion 22, the third face portion 13, the third corner portion 23, the fourth face portion 14, and the fourth corner portion 24. According to this, when it is unlikely that the insulating coating is left on the vertex of each of the fourth corner portion 24 and the second corner portion 22 after the first step and the second step are performed, such as when the fourth corner portion 24 and the second corner portion 22 are shaped to have right-angled cross-sections, the insulating coating 3 of the rectangular conducting wire 1 around the entire perimeter thereof including the fourth corner portion 24 and the second corner portion 22 is removable by performing only the two steps, namely, the first step and the second step.

Further, although the present embodiment illustrates that the third area Ar3 has the portion Ar3a overlapping the end portion of the first area Ar1 and the other portion Ar3b overlapping the end portion of the second area Ar2, this is not limiting. For example, the third area Ar3 may be a continuous area Ar30 (refer to FIG. 4B) having ends that overlap neither the first area Ar1 nor the second area Ar2. Likewise, although the present embodiment illustrates that the fourth area Ar4 has the portion Ar4a overlapping the end portion of the second area Ar2 and the other portion Ar4b overlapping the end portion of the first area Ar1, this is not limiting. For example, the fourth area Ar4 may be a continuous area Ar40 (refer to FIG. 4D) having ends that overlap neither the first area Ar1 nor the second area Ar2. In these cases, it is possible to narrow an area to which laser light is applied in the third step or in the fourth step and thus to reduce operation time.

Further, although the present embodiment illustrates that the angle $\theta 1$ formed in the first position at the intersection point of the straight line L1 parallel to the direction of the optical axis with each of the first face portion 11 and the second face portion 12 toward the first corner portion 21, the angle $\theta 2$ formed in the second position at the intersection point of the straight line L1 parallel to the direction of the optical axis with each of the third face portion 13 and the fourth face portion 14 toward the third corner portion 23, the angle $\theta 3$ formed in the third position at the intersection point of the straight line L1 parallel to the direction of the optical axis with each of the second face portion 12 and the third face portion 13 toward the second corner portion 22, and the angle $\theta 4$ formed in the fourth position at the intersection point of the straight line L1 parallel to the direction of the optical axis with each of the fourth face portion 14 and the first face portion 11 toward the fourth corner portion 24 are all 45°, this is not limiting.

As long as these angles $\theta 1$ to $\theta 4$ are greater than 0° and less than 90°, it is possible to irradiate two planar portions in a single step of applying laser light that is performed with the rectangular conducting wire 1 fixed. The more perpendicular the optical axis is, the more energy efficiency the planar portion receives. However, as energy efficiency for one of the two planar portions that are irradiated in the single application step increases, the energy efficiency for the other decreases. For this reason, these angles $\theta 1$ to $\theta 4$ need to be greater than 0° and less than 90°, and when taking into account angles of the two planar portions, which are irradiated in the single application step, with respect to each optical axis, these angles $\theta 1$ to $\theta 4$ are preferably greater than or equal to 30° and less than or equal to 60°, and are most preferably 45°.

Likewise, although the present embodiment illustrates that the angle θ11 formed at the intersection point P11 of the straight line L11 with the first face portion 11 toward the fourth corner portion 24, the angle θ12 formed at the intersection point P12 of the straight line L12 with the second face portion 12 toward the second corner portion 22, the angle θ13 formed at the intersection point P13 of the straight line L13 with the third face portion 13 toward the second corner portion 22, the angle θ14 formed at the intersection point P14 of the straight line L14 with the fourth face portion 14 toward the fourth corner portion 24, the angle θ15 formed at the intersection point P15 of the straight line L15 with the second face portion 12 toward the first corner portion 21, the angle θ16 formed at the intersection point P16 of the straight line L16 with the third face portion 13 toward the third corner portion 23, the angle θ17 formed at the intersection point P17 of the straight line L17 with the fourth face portion 14 toward the third corner portion 23, and the angle θ18 formed at the intersection point P18 of the straight line L18 with the first face portion 11 toward the first corner portion 21 are all 135°, this is not limiting.

As long as these angles θ11 to θ18 are obtuse angles, it is possible to irradiate two planar portions in a single step of applying laser light that is performed with the rectangular conducting wire 1 fixed. However, when taking into account angles of the two planar portions, which are irradiated in the single application step, with respect to each optical axis, these angles θ11 to θ18 are preferably greater than or equal to 120° and less than or equal to 150°, and are most preferably 135°.

Further, although the present embodiment illustrates that θ1=θ2=θ3=θ4=45° (θ11 to θ18=135°), this is not limiting as described above. Thus, the angles may differ from each other, for example, such that the angle θ1 in the first position in the first step is 30° whereas the angle θ2 in the second position in the second step is 60°. Therefore, although the present embodiment illustrates that the position change from the first position to the second position is made by a rotation of 180°, that the position change from the second position to the third position is made by a rotation of 90°, and that the position change from the third position to the fourth position is made by a rotation of 180°, this is not limiting, and the rotation angle is adjustable in accordance with θ1, θ2, θ3, and θ4.

Second Embodiment

Next, a second embodiment of the present disclosure is described in detail with reference to FIG. 5 to FIG. 7D. The present embodiment differs in structure from the first embodiment in that after a first step is performed, laser light is further applied in the first position to a fifth area Ar5 including the fourth corner portion 24 and to a sixth area Ar6 including the second corner portion 22, and in that after a second step is performed, laser light is further applied in the second position to a seventh area Ar7 including the second corner portion 22 and to an eighth area Ar8 including the fourth corner portion 24. However, the other structures are the same as those in the first embodiment and therefore are illustrated with the same reference characters without being described in detail.

A method of manufacturing the rectangular conducting wire 1 according to the present embodiment is described with reference to a flowchart illustrated in FIG. 5 and process charts illustrated in FIG. 6A to FIG. 7C. It is noted that in FIG. 6A to FIG. 7C, an insulating coating is represented by a thick continuous line, and laser light is represented by an arrow.

Figure 6A:
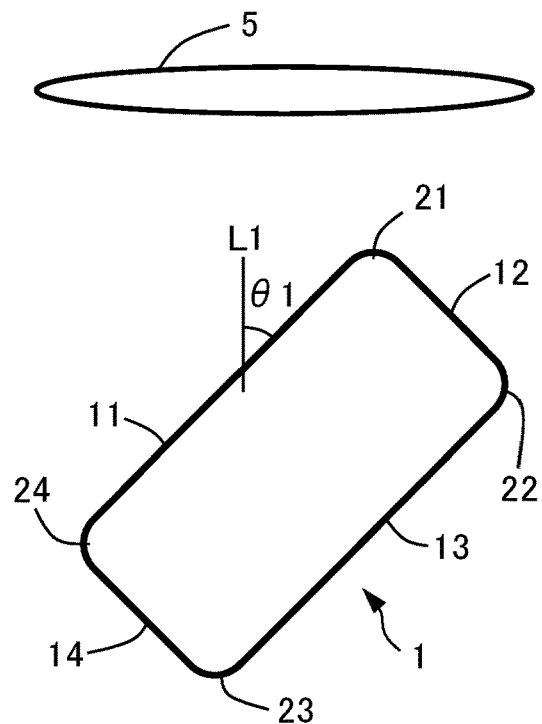
FIG. 6A is a simplified cross-sectional view of the rectangular conducting wire placed in a first position in the method of manufacturing the rectangular conducting wire according to the second embodiment.
Figure 6B:
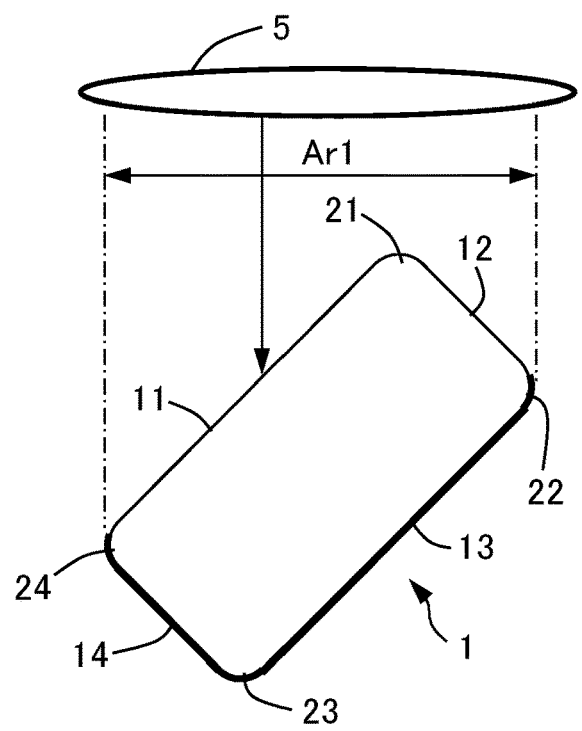
FIG. 6B is a simplified cross-sectional view of the rectangular conducting wire while laser light is being applied to a first area in a first step of the method of manufacturing the rectangular conducting wire according to the second embodiment.

First, the first step is the same as that in the first embodiment. That is, as illustrated in FIG. 6A, the rectangular conducting wire 1 is placed on the laser application device in the first position (step S1). Next, as illustrated in FIG. 6B, laser light is applied to a first area Ar1 (step S2, a first step). The first area Ar1 here is an area covering the fourth corner portion 24, the first face portion 11, the first corner portion 21, the second face portion 12, and the second corner portion 22.

Then, as illustrated in FIG. 6C, with the rectangular conducting wire 1 in the first position, the laser light is applied to the fifth area Ar5 including the fourth corner portion 24 and to the sixth area Ar6 including the second corner portion 22 (step S11, a fifth step). The fifth area Ar5 is required to include at least the fourth corner portion 24 and, according to the present embodiment, includes the fourth corner portion 24 and an end portion of the first face portion 11 connecting thereto. The sixth area Ar6 is required to include at least the second corner portion 22 and, according to the present embodiment, includes the second corner portion 22 and an end portion of the second face portion 12 connecting thereto. That is, each of the fifth area Ar5 and the sixth area Ar6 overlaps, at least in part, an end portion of the first area Ar1.

Figure 7A:
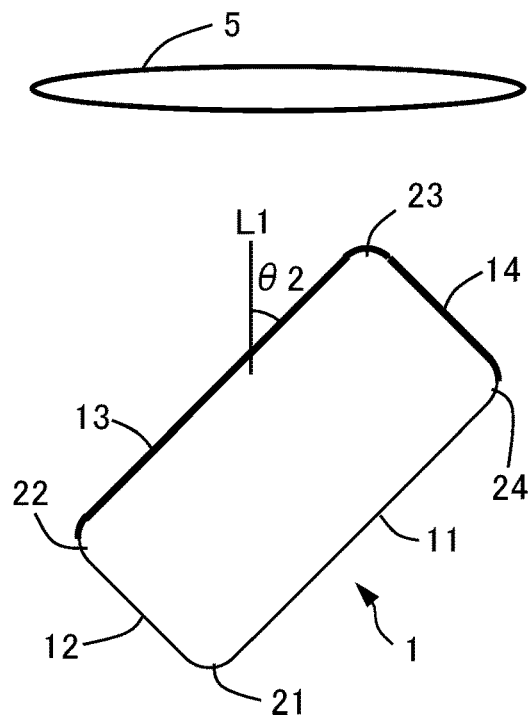
FIG. 7A is a simplified cross-sectional view of the rectangular conducting wire placed in a second position in the method of manufacturing the rectangular conducting wire according to the second embodiment.
Figure 7B:
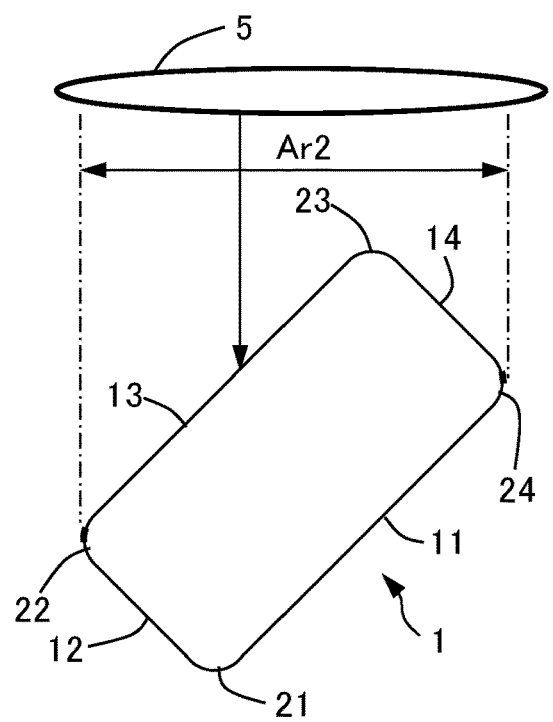
FIG. 7B is a simplified cross-sectional view of the rectangular conducting wire while laser light is being applied to a second area in a second step of the method of manufacturing the rectangular conducting wire according to the second embodiment.

Next, the second step is the same as that in the first embodiment. That is, as illustrated in FIG. 7A, the rectangular conducting wire 1 is rotated by 180° and is thereby placed in the second position (step S3). Then, as illustrated in FIG. 7B, the laser light is applied to a second area Ar2 (step S4, a second step). The second area Ar2 here is an area covering the second corner portion 22, the third face portion 13, the third corner portion 23, the fourth face portion 14, and the fourth corner portion 24.

Then, as illustrated in FIG. 7C, with the rectangular conducting wire 1 in the second position, the laser light is applied to the seventh area Ar7 including the second corner portion 22 and to the eighth area Ar8 including the fourth corner portion 24 (step S12, a sixth step). The seventh area Ar7 is required to include at least the second corner portion 22 and, according to the present embodiment, includes the second corner portion 22 and an end portion of the third face portion 13 connecting thereto. The eighth area Ar8 is required to include at least the fourth corner portion 24 and, according to the present embodiment, includes the fourth corner portion 24 and an end portion of the fourth face portion 14 connecting thereto. That is, each of the seventh area Ar7 and the eighth area Ar8 overlaps, at least in part, an end portion of the second area Ar2.

Thus, in the fifth step and the sixth step, laser light is applied intensively to the second corner portion 22 and the fourth corner portion 24, where insulating coating resides tend to occur, so as to locally increase the amount of heat input. This allows a reduction in the occurrence of insulating coating residues on the second corner portion 22 and the fourth corner portion 24, even when the rectangular conducting wire 1 is placed in the first position or the second position.

As described above, the method of manufacturing the rectangular conducting wire 1 according to the present embodiment applies laser light in the first position and applies laser light in the second position. Thus, in either case it is possible that two adjacent planar portions, two corner portions at both ends thereof, and one corner portion therebetween are irradiated in a single step of applying laser light that is performed with the rectangular conducting wire 1 fixed. As a result, an operation that applies the laser light around the entire perimeter of the rectangular conducting wire 1 is achievable in as little as two steps. Thus, in order to reduce the number of steps, it is unnecessary to apply paint for absorption to the corner portions of the rectangular conducting wire 1 before application of laser light. Therefore, it is possible to reduce the number of steps and to eliminate the need of an additional step, such as application of paint.

Further, in the method of manufacturing the rectangular conducting wire 1 according to the present embodiment, after the first step is performed, the laser light is applied to the fifth area Ar5 and to the sixth area Ar6, with the rectangular conducting wire 1 in the first position. Further, after the second step is performed, the laser light is applied to the seventh area Ar7 and to the eighth area Ar8, with the rectangular conducting wire 1 in the second position. Thus, in the fifth step and the sixth step, laser light is applied intensively to the second corner portion 22 and the fourth corner portion 24, where insulating coating resides tend to occur, so as to locally increase the amount of heat input. This reduces the occurrence of insulating coating residues on the second corner portion 22 and the fourth corner portion 24 without placing the rectangular conducting wire 1 in any position other than the first position or the second position, so that the rectangular conducting wire 1 needs to be rotated only once. Therefore, it is possible to reduce the number of steps and to eliminate the need of an additional step, such as application of paint.

Although the second embodiment described above illustrates that the fifth step is performed after the first step is performed and that the sixth step is performed after the second step is performed, this is not limiting. The first step may be performed after the fifth step is performed, and the second step may be performed after the sixth step is performed.

Third Embodiment

Figure 8:
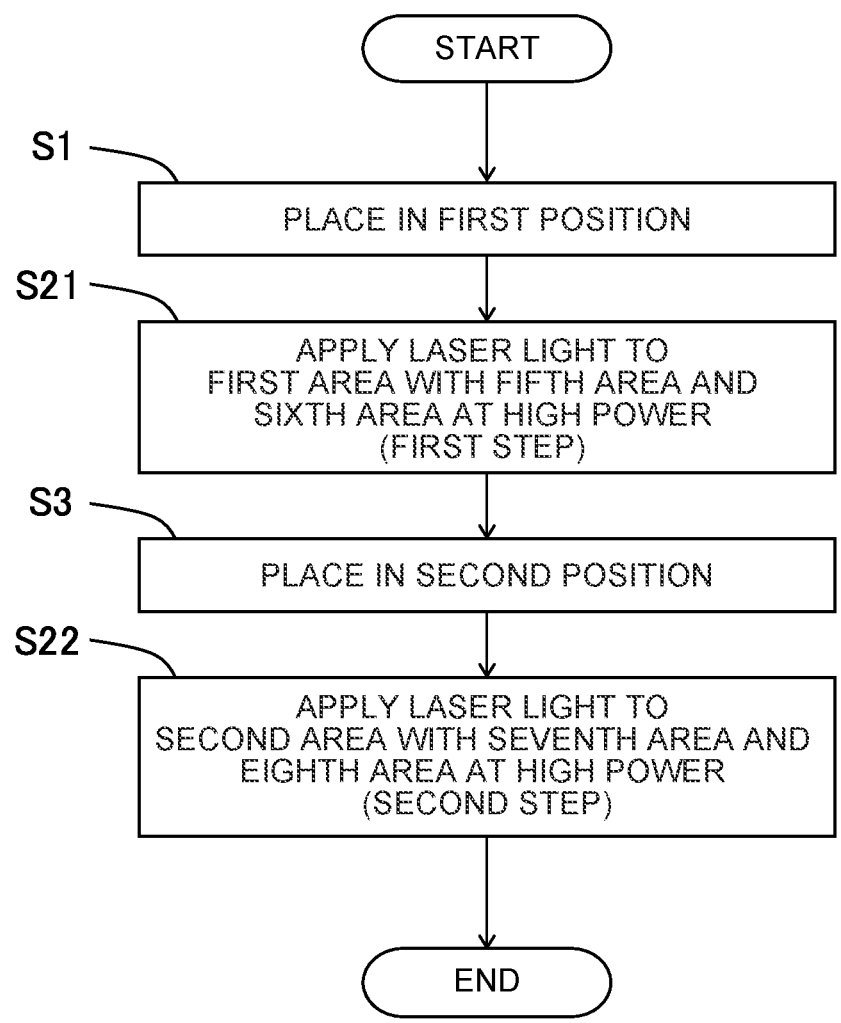
FIG. 8 is a flowchart illustrating a method of manufacturing a rectangular conducting wire according to a third embodiment.

Next, a third embodiment of the present disclosure is described in detail with reference to FIG. 8 to FIG. 9D. The present embodiment differs in structure from the first embodiment in that in a first step, a high-power laser light is applied to a fifth area Ar5 including the fourth corner portion 24 and to a sixth area Ar6 including the second corner portion 22, and in that in a second step, a high-power laser light is applied to a seventh area Ar7 including the second corner portion 22 and to an eighth area Ar8 including the fourth corner portion 24. However, the other structures are the same as those in the first embodiment and therefore are illustrated with the same reference characters without being described in detail.

A method of manufacturing the rectangular conducting wire 1 according to the present embodiment is described with reference to a flowchart illustrated in FIG. 8 and process charts illustrated in FIG. 9A to FIG. 9D. It is noted that in FIG. 9A to FIG. 9D, an insulating coating is represented by a thick continuous line, and laser light is represented by an arrow.

Figure 9A:
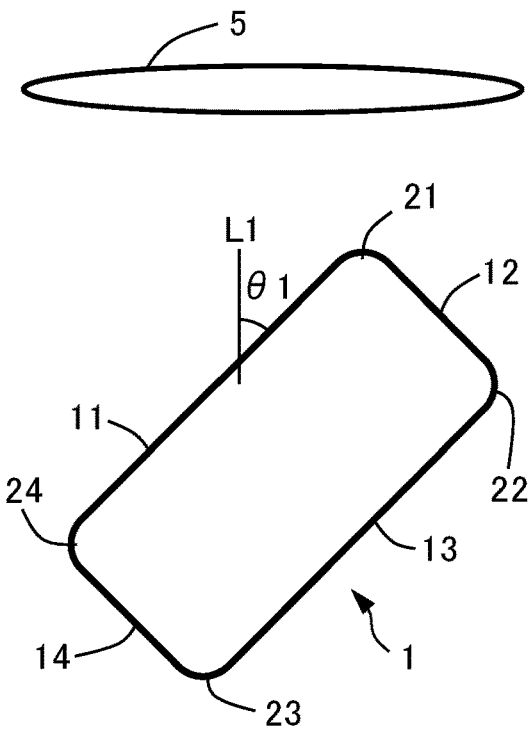
FIG. 9A is a simplified cross-sectional view of the rectangular conducting wire placed in a first position in the method of manufacturing the rectangular conducting wire according to the third embodiment.
Figure 9B:
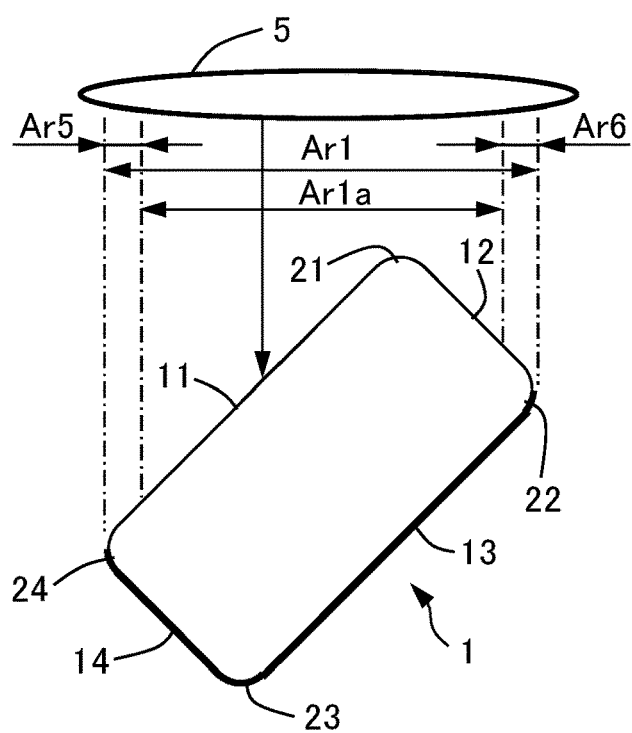
FIG. 9B is a simplified cross-sectional view of the rectangular conducting wire while laser light is being applied to a first area, to a fifth area, and to a sixth area in a first step of the method of manufacturing the rectangular conducting wire according to the third embodiment.

First, as illustrated in FIG. 9A, the rectangular conducting wire 1 is placed on the laser application device in the first position (step S1). Then, as illustrated in FIG. 9B, laser light is applied to a first area Ar1 (step S21, a first step). The first area Ar1 here is an area covering the fourth corner portion 24, the first face portion 11, the first corner portion 21, the second face portion 12, and the second corner portion 22.

Here, the laser light applied to the fifth area Ar5 and the sixth area Ar6 of the first area Ar1, respectively including the fourth corner portion 24 and the second corner portion 22, is higher in power than the laser light applied to an area Ar1a of the first area Ar1 other than the fifth area Ar5 or the sixth area Ar6.

Figure 9C:
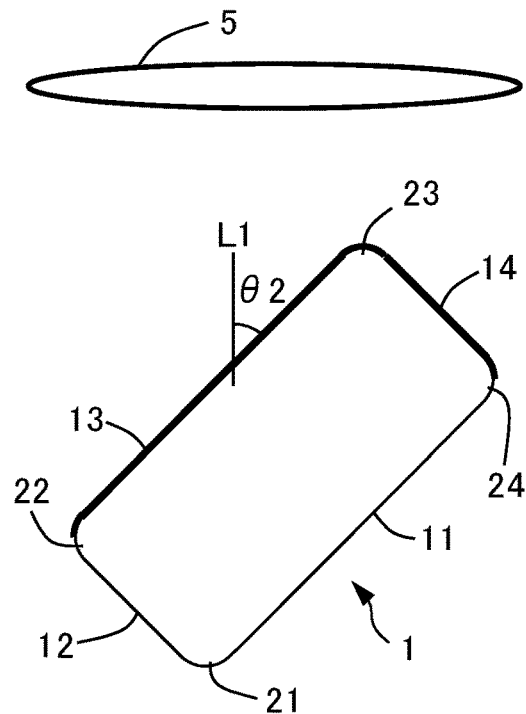
FIG. 9C is a simplified cross-sectional view of the rectangular conducting wire placed in a second position in the method of manufacturing the rectangular conducting wire according to the third embodiment.
Figure 9D:
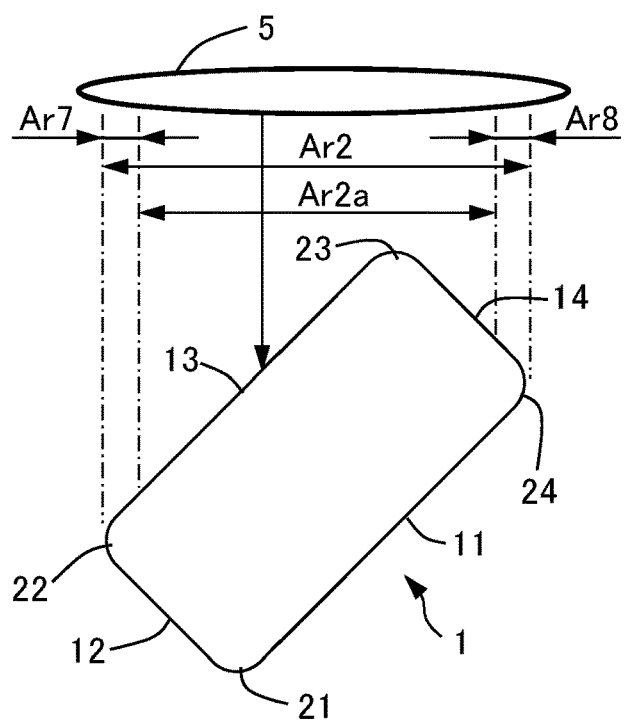
FIG. 9D is a simplified cross-sectional view of the rectangular conducting wire while laser light is being applied to a second area, to a seventh area, and to an eighth area in a second step of the method of manufacturing the rectangular conducting wire according to the third embodiment.

Next, as illustrated in FIG. 9C, the rectangular conducting wire 1 is rotated by 180° and is thereby placed on the laser application device in the second position (step S3). Then, as illustrated in FIG. 9D, laser light is applied to a second area Ar2 (step S22, a second step). The second area Ar2 here is an area covering the second corner portion 22, the third face portion 13, the third corner portion 23, the fourth face portion 14, and the fourth corner portion 24. Here, the laser light applied to the seventh area Ar7 and the eighth area Ar8 of the second area Ar2, respectively including the second corner portion 22 and the fourth corner portion 24, is higher in power than the laser light applied to an area Ar2a of the second area Ar2 other than the seventh area Ar7 or the eighth area Ar8.

Thus, in the first step and the second step, high-power laser light is applied to the second corner portion 22 and the fourth corner portion 24, where insulating coating resides tend to occur. This allows a reduction in the occurrence of insulating coating residues on the second corner portion 22 and the fourth corner portion 24, even when the rectangular conducting wire 1 is placed in the first position or the second position.

As described above, the method of manufacturing the rectangular conducting wire 1 according to the present embodiment applies laser light in the first position and applies laser light in the second position. Thus, in either case it is possible that two adjacent planar portions, two corner portions at both ends thereof, and one corner portion therebetween are irradiated in a single step of applying laser light that is performed with the rectangular conducting wire 1 fixed. As a result, an operation that applies the laser light around the entire perimeter of the rectangular conducting wire 1 is achievable in as little as two steps. Thus, in order to reduce the number of steps, it is unnecessary to apply paint for absorption to the corner portions of the rectangular conducting wire 1 before application of laser light. Therefore, it is possible to reduce the number of steps and to eliminate the need of an additional step, such as application of paint.

Further, in the method of manufacturing the rectangular conducting wire 1 according to the present embodiment, the first step applies a high-power laser light to the fifth area Ar5 and to the sixth area Ar6. Further, the second step applies a high-power laser light to the seventh area Ar7 and to the eighth area Ar8. Thus, in the first step and the second step, high-power laser light is applied intensively to the second corner portion 22 and the fourth corner portion 24, where insulating coating resides tend to occur, so as to locally increase the amount of heat input. This reduces the occurrence of insulating coating residues on the second corner portion 22 and the fourth corner portion 24 without placing the rectangular conducting wire 1 in any position other than the first position or the second position, so that the rectangular conducting wire 1 needs to be rotated only once. Therefore, it is possible to reduce the number of steps and to eliminate the need of an additional step, such as application of paint.

Fourth Embodiment

Next, a fourth embodiment of the present disclosure is described in detail with reference to FIG. 10 to FIG. 12C.

The present embodiment differs in structure from the first embodiment in that two laser application devices are provided to sandwich the rectangular conducting wire 1 therebetween. However, the other structures are the same as those in the first embodiment and therefore are illustrated with the same reference characters without being described in detail.

Figure 11C:
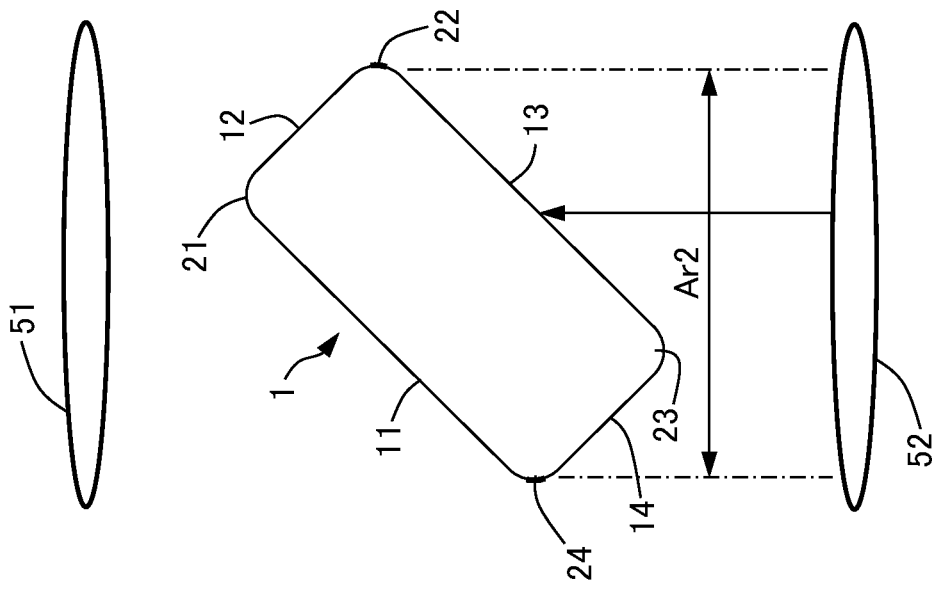
FIG. 11C is a simplified cross-sectional view of the rectangular conducting wire while second laser light is being applied to a second area in a second step of the method of manufacturing the rectangular conducting wire according to the fourth embodiment.
Figure 11B:
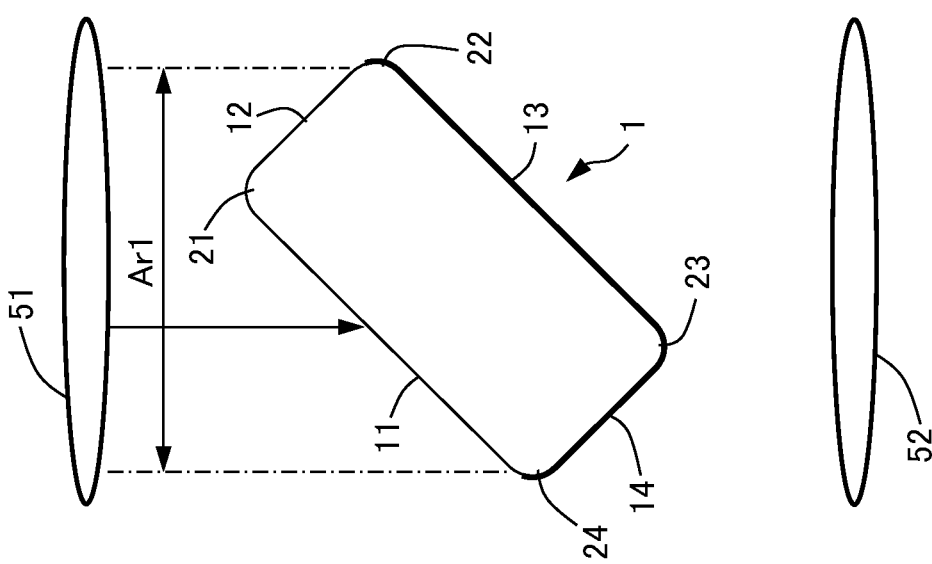
FIG. 11B is a simplified cross-sectional view of the rectangular conducting wire while first laser light is being applied to a first area in a first step of the method of manufacturing the rectangular conducting wire according to the fourth embodiment.
Figure 11A:
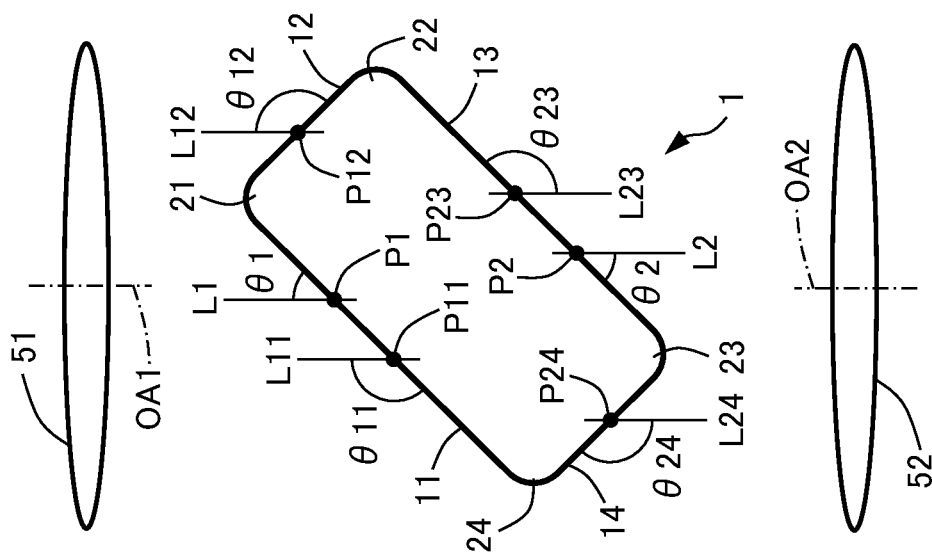
FIG. 11A is a simplified cross-sectional view of the rectangular conducting wire placed in a first position in the method of manufacturing the rectangular conducting wire according to the fourth embodiment.

As illustrated in FIG. 11A to FIG. 11C, a first application unit 51 of a first laser application device for applying first laser light and a second application unit 52 of a second laser application device for applying second laser light are placed in a manner capable of applying the light toward each other. That is, an optical axis OA1 of the first laser light and an optical axis OA2 of the second laser light are placed parallel to each other. The rectangular conducting wire 1 is placed between the first application unit 51 and the second application unit 52. The first laser application device and the second laser application device are structured in the same manner as the laser application device according to the first embodiment and, therefore, are not described in detail here.

Figure 10:
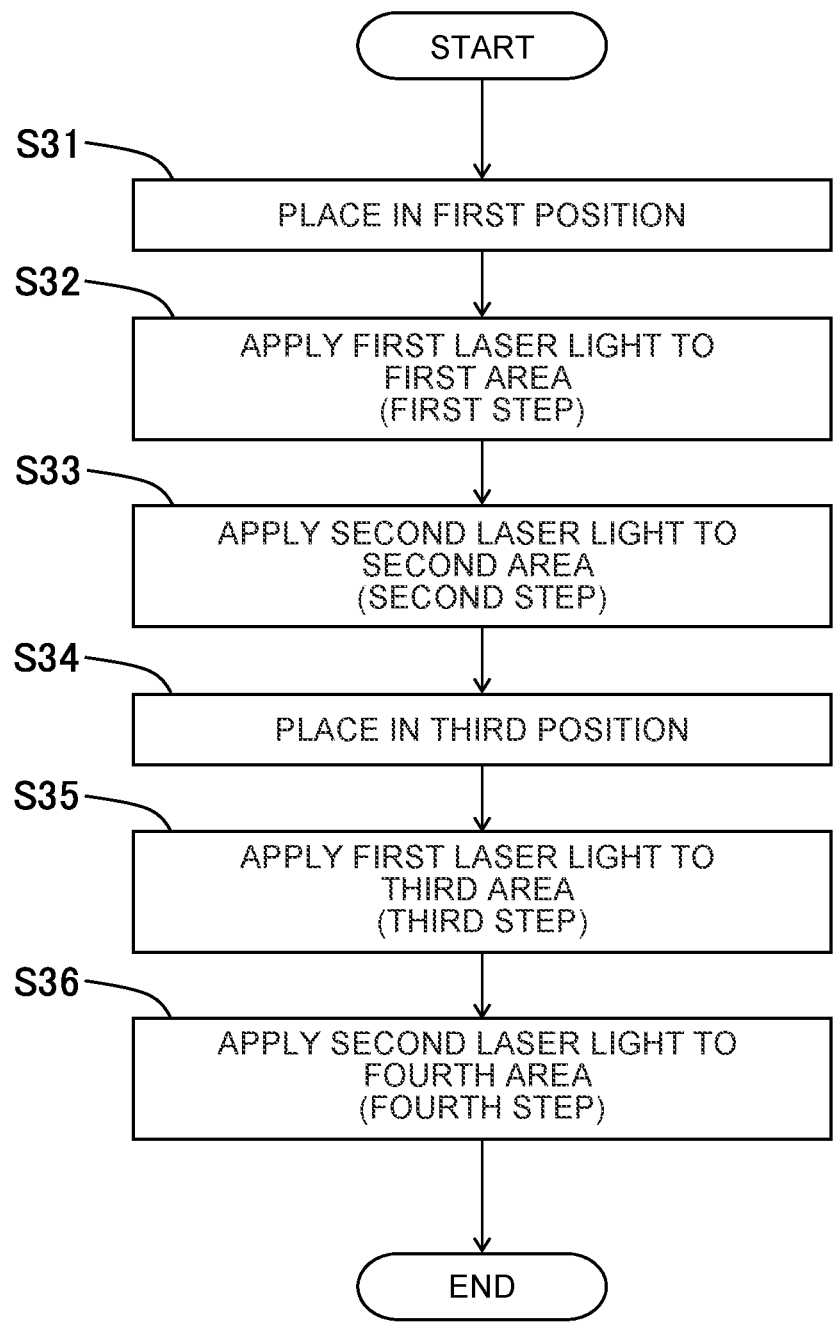
FIG. 10 is a flowchart illustrating a method of manufacturing a rectangular conducting wire according to a fourth embodiment.

A method of manufacturing the rectangular conducting wire 1 according to the present embodiment is described below with reference to a flowchart illustrated in FIG. 10 and process charts illustrated in FIG. 11A to FIG. 12C. It is noted that in FIG. 11A to FIG. 12C, an insulating coating is represented by a thick continuous line, and laser light is represented by an arrow.

First, as illustrated in FIG. 11A, the rectangular conducting wire 1 is placed between the first application unit 51 and the second application unit 52 in a first position (step S31). The first position according to the present embodiment is a position in which the first face portion 11 and the second face portion 12 face the first application unit 51 and are diagonal with respect to the optical axis OA1 of the first laser light. That is, the first position is a position in which an angle θ11 formed at an intersection point P11 of a straight line L11 parallel to the optical axis OA1 with the first face portion 11 toward the fourth corner portion 24 is an obtuse angle, and in which an angle θ12 formed at an intersection point P12 of a straight line L12 parallel to the optical axis OA1 with the second face portion 12 toward the second corner portion 22 is an obtuse angle. According to the present embodiment, in the first position, an angle θ1 formed at an intersection point P1 of a straight line L1 parallel to the direction of the optical axis OA1 with each of the first face portion 11 and the second face portion 12 toward the first corner portion 21 is 45°. That is, the rectangular conducting wire 1 is placed such that θ11=θ12=135°.

Further, in the first position, the third face portion 13 and the fourth face portion 14 face the second application unit 52 and are diagonal with respect to the optical axis OA2 of the second laser light. That is, in the first position, an angle θ23 formed at an intersection point P23 of a straight line L23 parallel to the optical axis OA2 with the third face portion 13 toward the second corner portion 22 is an obtuse angle, and in which an angle θ24 formed at an intersection point P24 of a straight line L24 parallel to the optical axis OA2 with the fourth face portion 14 toward the fourth corner portion 24 is an obtuse angle. According to the present embodiment, in the first position, an angle θ2 formed at an intersection point P2 of a straight line L2 parallel to the direction of the optical axis OA2 of the second laser light with each of the third face portion 13 and the fourth face portion 14 toward the third corner portion 23 is 45°. That is, the rectangular conducting wire 1 is placed such that θ23=θ24=135°.

As illustrated in FIG. 11B, the first laser light is applied from the first application unit 51 to a first area Ar1 (step S32, a first step). According to the present embodiment, the first area Ar1 is an area covering the first face portion 11, the first corner portion 21, and the second face portion 12. After that, as illustrated in FIG. 11C, the second laser light is applied from the second application unit 52 to a second area Ar2 without rotating the rectangular conducting wire 1 (step S33, a second step). According to the present embodiment, the second area Ar2 is an area covering the third face portion 13, the third corner portion 23, and the fourth face portion 14.

The first step and the second step described above allow application of laser light to the first face portion 11, the second face portion 12, the third face portion 13, and the fourth face portion 14 around the entire perimeter of the rectangular conducting wire 1, thus permitting removal of the insulating coating 3 (refer to FIG. 1) on almost the entire perimeter. However, since each corner portion is arc-shaped in cross section, and a vertex of each of the second corner portion 22 and the fourth corner portion 24 is irradiated with laser light from the side, there is a possibility that a slight amount of the insulating coating may be left on the vertex of each of the second corner portion 22 and the fourth corner portion 24. For this reason, according to the present embodiment, after the first step and the second step are performed, laser light is further applied to each of the second corner portion 22 and the fourth corner portion 24 from the vertex side thereof.

Since this is performed to remove the insulating coating that may be left on the vertexes of the second corner portion 22 and the fourth corner portion 24, the removal is possible by laser light that is lower in power than that used in the first step and the second step. Therefore, according to the present embodiment, after the second step is finished, the rectangular conducting wire 1 is unplaced from the laser application device and is then placed on another low-power laser application device to perform steps described below.

As illustrated in FIG. 12A to FIG. 12C, a first application unit 61 of a first laser application device for applying a low-power first laser light and a second application unit 62 of a second laser application device for applying a low-power second laser light are placed in a manner capable of applying the light toward each other. That is, an optical axis OA1 of the first laser light and an optical axis OA2 of the second laser light are placed parallel to each other. The rectangular conducting wire 1 is placed between the first application unit 61 and the second application unit 62. Each low-power laser application device is structured in the same manner as the low-power laser application device according to the first embodiment described above and, therefore, is not described in detail here.

After the second step is finished, as illustrated in FIG. 12A, the rectangular conducting wire 1 is placed on the low-power laser application devices in a third position that is rotated by 90° from the first position (step S34). The third position according to the present embodiment is a position in which the second corner portion 22 faces the application unit 61 for the first laser light and is diagonal with respect to the optical axis of the first laser light. That is, the third position is a position in which an angle θ15 formed at an intersection point P15 of a straight line L15 parallel to the optical axis OA1 with the second face portion 12 toward the first corner portion 21 is an obtuse angle, and in which an angle θ16 formed at an intersection point P16 of a straight line L16 parallel to the optical axis OA1 with the third face portion 13 toward the third corner portion 23 is an obtuse angle. According to the present embodiment, in the third position, an angle θ3 formed at an intersection point P3 of the straight line L1 parallel to the direction of the optical axis OA1 with each of the second face portion 12 and the third face portion 13 toward the second corner portion 22 is 45°. That is, the rectangular conducting wire 1 is placed such that θ15=θ16=135°.

Further, in the third position, the fourth corner portion 24 faces the second application unit 62 and is diagonal with respect to the optical axis OA2 of the second laser light. That is, in the third position, an angle θ27 formed at an intersection point P27 of a straight line L27 parallel to the optical axis OA2 with the fourth face portion 14 toward the third corner portion 23 is an obtuse angle, and an angle θ28 formed at an intersection point P28 of a straight line L28 parallel to the optical axis OA2 with the first face portion 11 toward the first corner portion 21 is an obtuse angle. According to the present embodiment, in the third position, an angle θ4 formed at an intersection point P4 of the straight line L2 parallel to the direction of the optical axis OA2 with each of the fourth face portion 14 and the first face portion 11 toward the fourth corner portion 24 is 45°. That is, the rectangular conducting wire 1 is placed such that θ27=θ28=135°.

As illustrated in FIG. 12B, the first laser light is applied from the first application unit 61 to a third area Ar3 (step S35, a third step). According to the present embodiment, the third area Ar3 is an area including the second corner portion 22, and a portion Ar3a of the third area Ar3 overlaps an end portion of the first area Ar1 while another portion Ar3b of the third area Ar3 overlaps an end portion of the second area Ar2. The first laser light that is applied to the third area Ar3 in the third step is lower in power than the first laser light that is applied to the first area Ar1 in the first step.

After that, as illustrated in FIG. 12C, the second laser light is applied from the second application unit 62 to a fourth area Ar4 without rotating the rectangular conducting wire 1 (step S36, a fourth step). According to the present embodiment, the fourth area Ar4 is an area including the fourth corner portion 24, and a portion Ar4a of the fourth area Ar4 overlaps an end portion of the second area Ar2 while another portion Ar4b of the fourth area Ar4 overlaps an end portion of the first area Ar1. The second laser light that is applied to the fourth area Ar4 in the fourth step is lower in power than the second laser light that is applied to the first area Ar1 in the first step.

By performing the first to fourth steps described above, it is possible to apply the laser light to the rectangular conducting wire 1 having the insulating coating 3 (refer to FIG. 1) formed on the surface thereof and thus to remove the insulating coating 3.

As described above, the method of manufacturing the rectangular conducting wire 1 according to the present embodiment applies the first laser light and the second laser light in the first position. Thus, in either case it is possible that two adjacent planar portions and one corner portion therebetween are irradiated in a single step of applying laser light that is performed with the rectangular conducting wire 1 fixed. As a result, an operation that applies the laser light around the entire perimeter of the rectangular conducting wire 1 is achievable in as little as two steps. Thus, in order to reduce the number of steps, it is unnecessary to apply paint for absorption to the corner portions of the rectangular conducting wire 1 before application of laser light. Therefore, it is possible to reduce the number of steps and to eliminate the need of an additional step, such as application of paint.

Further, in the method of manufacturing the rectangular conducting wire 1 according to the present embodiment, the first application unit 51 and the second application unit 52 are placed to sandwich the rectangular conducting wire 1 therebetween. This allows continuous application of laser light to the first area Ar1 and the second area Ar2 without rotating the rectangular conducting wire 1 between the first step and the second step. Thus, it is possible to reduce operation time as compared with when the rectangular conducting wire 1 is rotated between the first step and the second step.

Further, the method of manufacturing the rectangular conducting wire 1 according to the present embodiment performs the third step and the fourth step after performing the first step and the second step, thereby applying laser light to the second corner portion 22 and to the fourth corner portion 24. Thus, even when a slight amount of the insulating coating is left on the vertex of each of the second corner portion 22 and the fourth corner portion 24 because of the arc-shaped cross section of each corner portion, it is possible to reduce the occurrence of insulating coating residues. It is noted that although the fourth embodiment described above illustrates that two laser application devices are provided, this is not limiting, and three or more laser application devices may be provided.

Further, although the fourth embodiment described above illustrates that the second step is performed after the first step is finished, this is not limiting, and the first step and the second step may be performed in parallel simultaneously. This approach allows a reduction in operation time.

Fifth Embodiment

Next, a fifth embodiment of the present disclosure is described in detail with reference to FIG. 13 to FIG. 15B. The present embodiment differs in structure from the second embodiment in that two laser application devices are provided to sandwich the rectangular conducting wire 1 therebetween. In addition, the present embodiment differs in structure from the fourth embodiment in that after a first step is performed, first laser light is further applied in the first position to a fifth area Ar5 including the fourth corner portion 24 and to a sixth area Ar6 including the second corner portion 22, and in that after a second step is performed, second laser light is further applied to a seventh area Ar7 including the second corner portion 22 and to an eighth area Ar8 including the fourth corner portion 24. However, the other structures are the same as those in the second embodiment and the fourth embodiment, and therefore are illustrated with the same reference characters without being described in detail.

A method of manufacturing the rectangular conducting wire 1 according to the present embodiment is described with reference to a flowchart illustrated in FIG. 13 and process charts illustrated in FIG. 14A to FIG. 15B. It is noted that in FIG. 14A to FIG. 15B, an insulating coating is represented by a thick continuous line, and laser light is represented by an arrow.

First, the first step is the same as that in the fourth embodiment. That is, as illustrated in FIG. 14A, the rectangular conducting wire 1 is placed on the laser application device in the first position (step S31). Then, as illustrated in FIG. 14B, the first laser light is applied from the first application unit 51 to a first area Ar1 (step S32, a first step). The first area Ar1 here is an area covering the fourth corner portion 24, the first face portion 11, the first corner portion 21, the second face portion 12, and the second corner portion 22.

Then, as illustrated in FIG. 14C, with the rectangular conducting wire 1 in the first position, the first laser light is applied from the first application unit 51 to the fifth area Ar5 including the fourth corner portion 24 and to the sixth area Ar6 including the second corner portion 22 (step S41, a fifth step). The fifth area Ar5 is required to include at least the fourth corner portion 24 and, according to the present embodiment, includes the fourth corner portion 24 and an end portion of the first face portion 11 connecting thereto. The sixth area Ar6 is required to include at least the second corner portion 22 and, according to the present embodiment, includes the second corner portion 22 and an end portion of the second face portion 12 connecting thereto. That is, each of the fifth area Ar5 and the sixth area Ar6 overlaps, at least in part, an end portion of the first area Ar1.

Figure 15B:
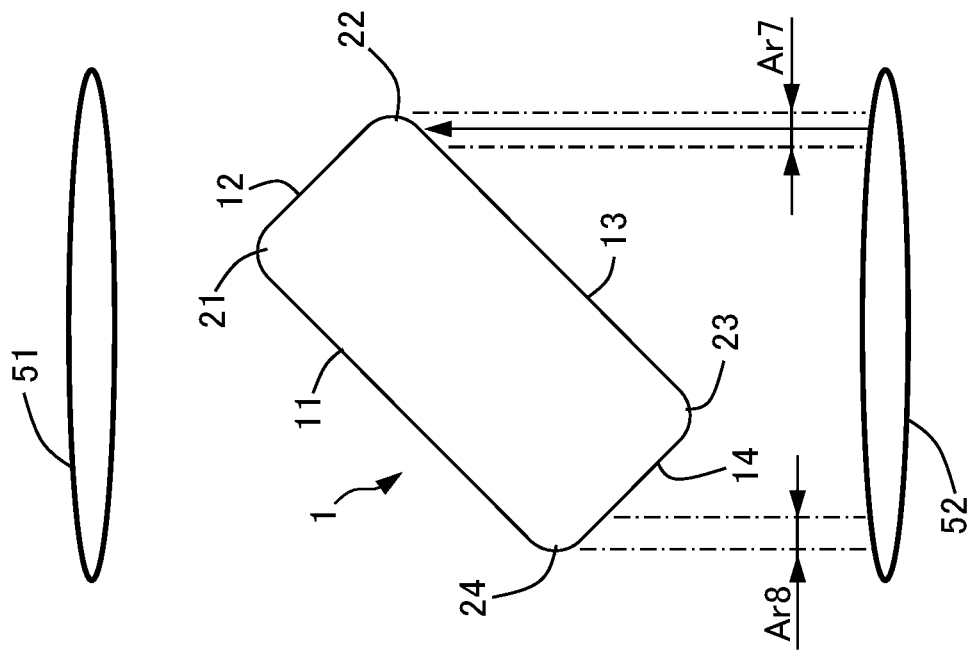
FIG. 15B is a simplified cross-sectional view of the rectangular conducting wire while the second laser light is being applied to a seventh area and to an eighth area in a sixth step of the method of manufacturing the rectangular conducting wire according to the fifth embodiment.
Figure 15A:
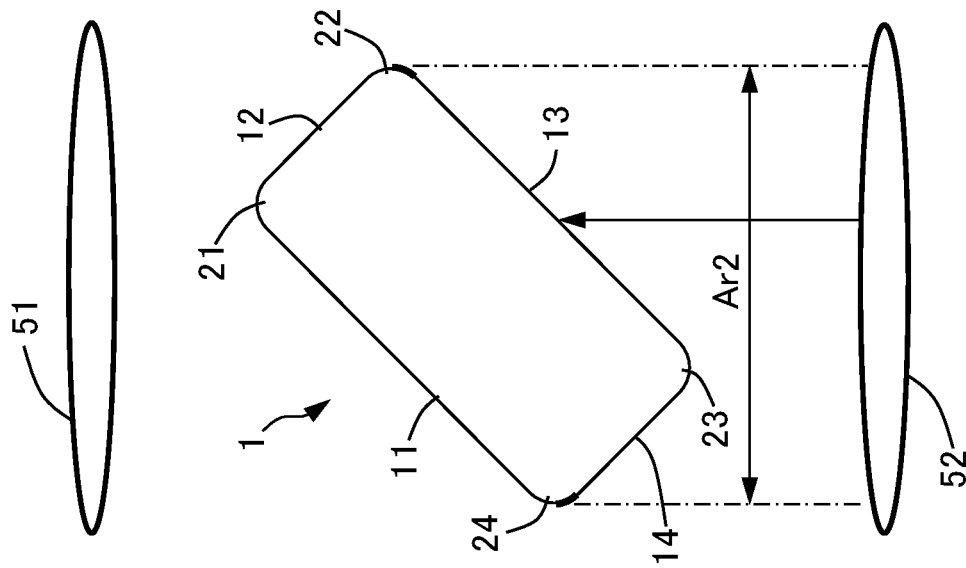
FIG. 15A is a simplified cross-sectional view of the rectangular conducting wire while second laser light is being applied to a second area during a second step of the method of manufacturing the rectangular conducting wire according to the fifth embodiment.

After that, as illustrated in FIG. 15A, the second laser light is applied from the second application unit 52 to a second area Ar2, without rotating the rectangular conducting wire 1 (step S34, a second step). The second area Ar2 here is an area covering the second corner portion 22, the third face portion 13, the third corner portion 23, the fourth face portion 14, and the fourth corner portion 24.

Then, as illustrated in FIG. 15B, the second laser light is applied from the second application unit 52 to a seventh area Ar7 including the second corner portion 22 and to an eighth area Ar8 including the fourth corner portion 24 (step S42, a sixth step). The seventh area Ar7 is required to include at least the second corner portion 22 and, according to the present embodiment, includes the second corner portion 22 and an end portion of the third face portion 13 connecting thereto. The eighth area Ar8 is required to include at least the fourth corner portion 24 and, according to the present embodiment, includes the fourth corner portion 24 and an end portion of the fourth face portion 14 connecting thereto. That is, each of the seventh area Ar7 and the eighth area Ar8 overlaps, at least in part, an end portion of the second area Ar2.

Thus, in the fifth step and the sixth step, laser light is applied intensively to the second corner portion 22 and the fourth corner portion 24, where insulating coating resides tend to occur, so as to locally increase the amount of heat input. This allows a reduction in the occurrence of insulating coating residues on the second corner portion 22 and the fourth corner portion 24, even when the rectangular conducting wire 1 is placed in the first position or the second position.

As described above, the method of manufacturing the rectangular conducting wire 1 according to the present embodiment applies the first laser light and the second laser light in the first position. Thus, in either case it is possible that two adjacent planar portions, two corner portions at both ends thereof, and one corner portion therebetween are irradiated in a single step of applying laser light that is performed with the rectangular conducting wire 1 fixed. As a result, an operation that applies the laser light around the entire perimeter of the rectangular conducting wire 1 is achievable in as little as two steps. Thus, in order to reduce the number of steps, it is unnecessary to apply paint for absorption to the corner portions of the rectangular conducting wire 1 before application of laser light. Therefore, it is possible to reduce the number of steps and to eliminate the need of an additional step, such as application of paint.

Further, in the method of manufacturing the rectangular conducting wire 1 according to the present embodiment, the first application unit 51 and the second application unit 52 are placed to sandwich the rectangular conducting wire 1 therebetween. This allows continuous application of laser light to the sixth area Ar6 and the second area Ar2 without rotating the rectangular conducting wire 1 between the first step and the second step. Thus, it is possible to reduce operation time as compared with when the rectangular conducting wire 1 is rotated between the first step and the second step.

Sixth Embodiment

Figure 16:
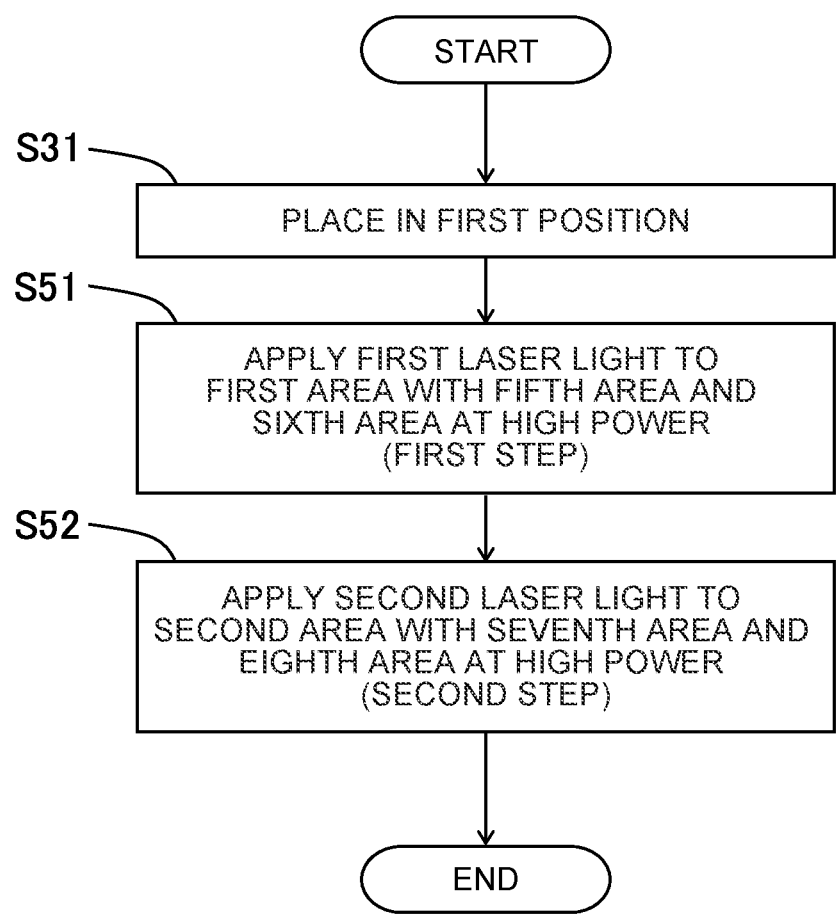
FIG. 16 is a flowchart illustrating a method of manufacturing a rectangular conducting wire according to a sixth embodiment.

Next, a sixth embodiment of the present disclosure is described in detail with reference to FIG. 16 to FIG. 17C. The present embodiment differs in structure from the third embodiment in that two laser application devices are provided to sandwich the rectangular conducting wire 1 therebetween. In addition, the present embodiment differs in structure from the fourth embodiment in that a high-power first laser light is applied in a first step to a fifth area Ar5 including the fourth corner portion 24 and to a sixth area Ar6 including the second corner portion 22, and in that a high-power second laser light is applied in a second step to a seventh area Ar7 including the second corner portion 22 and to an eighth area Ar8 including the fourth corner portion 24. However, the other structures are the same as those in the third embodiment and the fourth embodiment, and therefore are illustrated with the same reference characters without being described in detail.

A method of manufacturing the rectangular conducting wire 1 according to the present embodiment is described with reference to a flowchart illustrated in FIG. 16 and process charts illustrated in FIG. 16. It is noted that in FIG. 17A to FIG. 17C, an insulating coating is represented by a thick continuous line, and laser light is represented by an arrow.

Figure 17A:
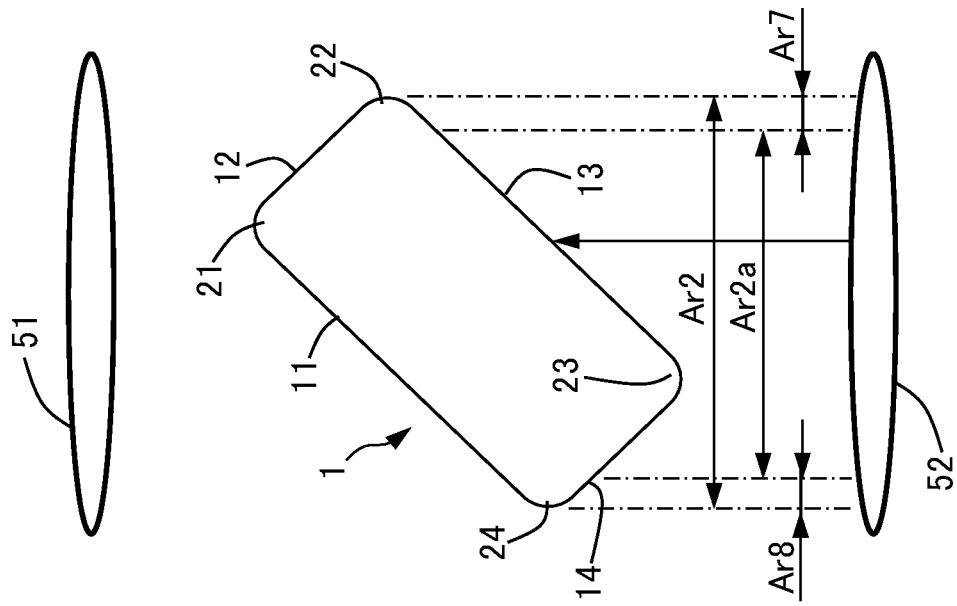
FIG. 17A is a simplified cross-sectional view of the rectangular conducting wire placed in a first position in the method of manufacturing the rectangular conducting wire according to the sixth embodiment.
Figure 17B:
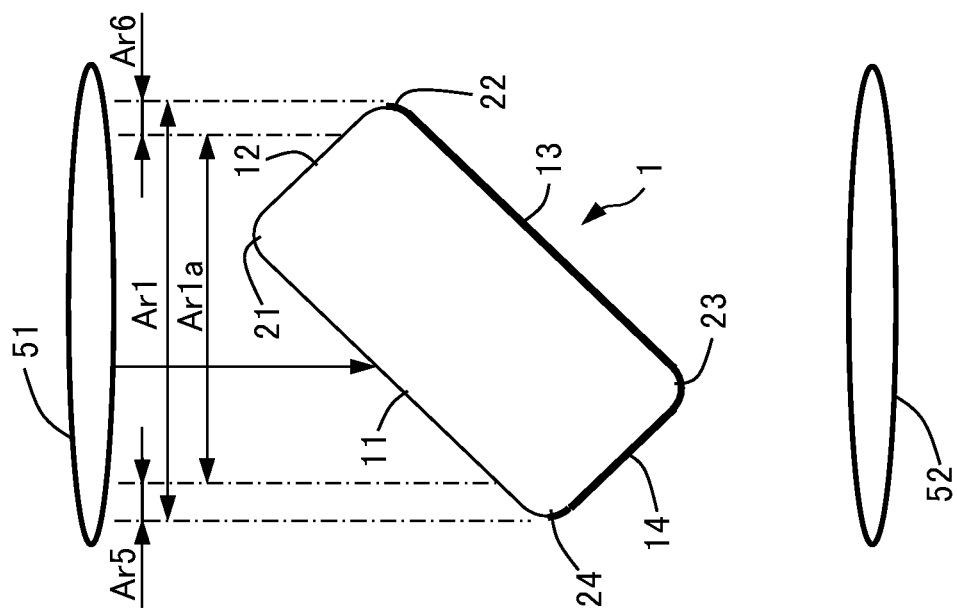
FIG. 17B is a simplified cross-sectional view of the rectangular conducting wire while laser light is being applied to a first area, to a fifth area, and to a sixth area in a first step of the method of manufacturing the rectangular conducting wire according to the sixth embodiment.

First, as illustrated in FIG. 17A, the rectangular conducting wire 1 is placed on the laser application device in the first position (step S31). Then, as illustrated in FIG. 17B, the first laser light is applied from the first application unit 51 to a first area Ar1 (step S51, a first step). The first area Ar1 here is an area covering the fourth corner portion 24, the first face portion 11, the first corner portion 21, the second face portion 12, and the second corner portion 22. Here, the first laser light applied to the fifth area Ar5 and the sixth area Ar6 of the first area Ar1, respectively including the fourth corner portion 24 and the second corner portion 22, is higher in power than the first laser light applied to an area Ar1a of the first area Ar1 other than the fifth area Ar5 or the sixth area Ar6.

Figure 17C:
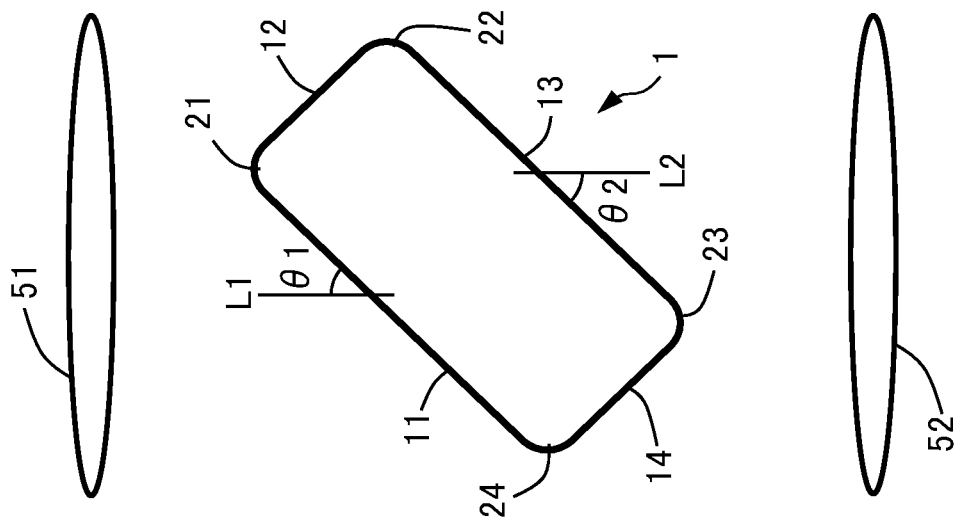
FIG. 17C is a simplified cross-sectional view of the rectangular conducting wire while laser light is being applied to a second area, to a seventh area, and to an eighth area in a second step of the method of manufacturing the rectangular conducting wire according to the sixth embodiment.

After that, as illustrated in FIG. 17C, the second laser light is applied from the second application unit 52 to a second area Ar2 without rotating the rectangular conducting wire 1 (step S52, a second step). The second area Ar2 here is an area covering the second corner portion 22, the third face portion 13, the third corner portion 23, the fourth face portion 14, and the fourth corner portion 24. Here, the second laser light applied to the seventh area Ar7 and the eighth area Ar8 of the second area Ar2, respectively including the second corner portion 22 and the fourth corner portion 24, is higher in power than the second laser light applied to an area Ar2a of the second area Ar2 other than the seventh area Ar7 or the eighth area Ar8.

Thus, in the first step and the second step, high-power laser light is applied to the second corner portion 22 and the fourth corner portion 24, where insulating coating resides tend to occur. This allows a reduction in the occurrence of insulating coating residues on the second corner portion 22 and the fourth corner portion 24, even when the rectangular conducting wire 1 is placed in the first position or the second position.

As described above, the method of manufacturing the rectangular conducting wire 1 according to the present embodiment applies the first laser light and the second laser light in the first position. Thus, in either case it is possible that two adjacent planar portions, two corner portions at both ends thereof, and one corner portion therebetween are irradiated in a single step of applying laser light that is performed with the rectangular conducting wire 1 fixed. As a result, an operation that applies the laser light around the entire perimeter of the rectangular conducting wire 1 is achievable in as little as two steps. Thus, in order to reduce the number of steps, it is unnecessary to apply paint to the corner portions of the rectangular conducting wire 1 before application of laser light. Therefore, it is possible to reduce the number of steps and to eliminate the need of an additional step, such as application of paint.

Further, in the method of manufacturing the rectangular conducting wire 1 according to the present embodiment, the first application unit 51 and the second application unit 52 are placed to sandwich the rectangular conducting wire 1 therebetween. This allows continuous application of laser light to the first area Ar1 and the second area Ar2 without rotating the rectangular conducting wire 1 between the first step and the second step. Thus, it is possible to reduce operation time as compared with when the rectangular conducting wire 1 is rotated between the first step and the second step.

Summary of the Embodiments

The first to sixth embodiments described above include at least the following structures. A method of manufacturing a rectangular conducting wire (1) according to the first to sixth embodiments is a method in which an insulating coating (3) of the rectangular conducting wire (1) is removed by applying laser light to the insulating coating (3), wherein four planar portions on an exterior of the rectangular conducting wire (1) are defined in adjacent order of arrangement as a first face portion (11), a second face portion (12), a third face portion (13), and a fourth face portion (14), a corner portion between the first face portion (11) and the second face portion (12) is defined as a first corner portion (21), a corner portion between the second face portion (12) and the third face portion (13) is defined as a second corner portion (22), a corner portion between the third face portion (13) and the fourth face portion (14) is defined as a third corner portion (23), and a corner portion between the fourth face portion (14) and the first face portion (11) is defined as a fourth corner portion (24). This method is provided with a first step of applying the laser light to a first area (Ar1) including the first face portion (11), the first corner portion (21), and the second face portion (12), with the rectangular conducting wire (1) placed in a first position where the first face portion (11) and the second face portion (12) face an application unit (5, 6, 51, 61) for applying the laser light, where an angle (θ11) formed at an intersection point (P11) of a straight line (L11) parallel to an optical axis (OA1) of the laser light with the first face portion (11) toward the fourth corner portion (24) is an obtuse angle, and where an angle (θ12) formed at an intersection point (P12) of a straight line (L12) parallel to the optical axis (OA1) with the second face portion (12) toward the second corner portion (22) is an obtuse angle.

According to this structure, laser light is applied in the first position, and laser light is applied in the second position. Thus, in either case it is possible that two adjacent planar portions and one corner portion therebetween are irradiated in a single step of applying laser light that is performed with the rectangular conducting wire (1) fixed. Thus, in order to reduce the number of steps, it is unnecessary to apply paint for absorption to the corner portions of the rectangular conducting wire (1) before application of laser light. Therefore, it is possible to reduce the number of steps and to eliminate the need of an additional step, such as application of paint.

The method of manufacturing the rectangular conducting wire (1) according to the first to third embodiments is further provided with a second step of applying the laser light to a second area (Ar2) including the third face portion (13), the third corner portion (23), and the fourth face portion (14), with the rectangular conducting wire (1) placed in a second position where the third face portion (13) and the fourth face portion (14) face the application unit (5, 6) for applying the laser light, where an angle (θ13) formed at an intersection point (P13) of a straight line (L13) parallel to the optical axis (OA1) with the third face portion (13) toward the second corner portion (22) is an obtuse angle, and where an angle (θ14) formed at an intersection point (P14) of a straight line (L14) parallel to the optical axis (OA1) with the fourth face portion (14) toward the fourth corner portion (24) is an obtuse angle.

According to this structure, laser light is applied in the second position after laser light is applied in the first position. The application of laser light in the second position also allows two adjacent planar portions and one corner portion therebetween to be irradiated in a single step of applying laser light that is performed with the rectangular conducting wire (1) fixed. Thus, an operation that applies the laser light around the entire perimeter of the rectangular conducting wire (1) is achievable in as little as two steps.

The method of manufacturing the rectangular conducting wire (1) according to the first embodiment is further provided with a third step of applying the laser light to a third area (Ar3) including the second corner portion (22), with the rectangular conducting wire (1) placed in a third position where the second corner portion (22) faces the application unit (6) for applying the laser light, where an angle (θ15) formed at an intersection point (P15) of a straight line (L15) parallel to the optical axis (OA2) with the second face portion (12) toward the first corner portion (21) is an obtuse angle, and where an angle (θ16) formed at an intersection point (P16) of a straight line (L16) parallel to the optical axis (OA2) with the third face portion (13) toward the third corner portion (23) is an obtuse angle, and a fourth step of applying the laser light to a fourth area including the fourth corner portion (24), with the rectangular conducting wire (1) placed in a fourth position where the fourth corner portion (24) faces the application unit (6) for applying the laser light, where an angle (θ17) formed at an intersection point (P17) of a straight line (L17) parallel to the optical axis (OA2) with the fourth face portion (14) toward the third corner portion (23) is an obtuse angle, and where an angle (θ18) formed at an intersection point (P18) of a straight line (L18) parallel to the optical axis (OA2) with the first face portion (11) toward the first corner portion (21) is an obtuse angle.

This structure is capable of reducing the occurrence of insulating coating residues even when a slight amount of the insulating coating (3) is left on the vertex of each of the second corner portion (22) and the fourth corner portion (24).

The method of manufacturing the rectangular conducting wire (1) according to the fourth to sixth embodiments is such that the laser light is first laser light applied from a first application unit (51, 61), and is further provided with a second step of applying second laser light different from the first laser light to a second area (Ar2) including the third face portion (13), the third corner portion (23), and the fourth face portion (14), with the rectangular conducting wire (1) placed such that the third face portion (13) and the fourth face portion (14) face a second application unit (52, 62) for applying the second laser light, such that an angle (θ23) formed at an intersection point (P23) of a straight line (L23) parallel to an optical axis (OA2) of the second laser light with the third face portion (13) toward the second corner portion (22) is an obtuse angle, and such that an angle (θ24) formed at an intersection point (P24) of a straight line (L24) parallel to the optical axis (OA2) with the fourth face portion (14) toward the fourth corner portion (24) is an obtuse angle.

According to this structure, the first laser light and the second laser light are applied in the first position. Thus, in either case it is possible that two adjacent planar portions and one corner portion therebetween are irradiated in a single step of applying laser light that is performed with the rectangular conducting wire (1) fixed. As a result, an operation that applies laser light around the entire perimeter of the rectangular conducting wire 1 is achievable in as little as two steps. Thus, in order to reduce the number of steps, it is unnecessary to apply paint for absorption to the corner portions of the rectangular conducting wire (1) before application of laser light. Therefore, it is possible to reduce the number of steps and to eliminate the need of an additional step, such as application of paint. Further, since the application unit (51, 61) for applying the first laser light to the first area (Ar1) and the application unit (52, 62) for applying the second laser light to the second area (Ar2) are provided as separate application units, the laser light is applicable to the first area (Ar1) and the second area (Ar2) successively or simultaneously without rotating the rectangular conducting wire (1) between the first step and the second step. Thus, it is possible to reduce operation time as compared with when the rectangular conducting wire (1) is rotated between the first step and the second step.

The method of manufacturing the rectangular conducting wire (1) according to the fourth embodiment is further provided with a third step of applying the first laser light to a third area (Ar3) including the second corner portion (22), with the rectangular conducting wire (1) placed such that the second corner portion (22) faces the first application unit (51, 61), such that an angle (θ15) formed at an intersection point (P15) of a straight line (L15) parallel to the optical axis (OA1) of the first laser light with the second face portion (12) toward the first corner portion (21) is an obtuse angle, and such that an angle (θ16) formed at an intersection point (P16) of a straight line (L16) parallel to the optical axis (OA1) of the first laser light with the third face portion (13) toward the third corner portion (23) is an obtuse angle, and a fourth step of applying the second laser light to a fourth area including the fourth corner portion (24), with the rectangular conducting wire (1) placed such that the fourth corner portion (24) faces the second application unit (52, 62), such that an angle (θ27) formed at an intersection point (P27) of a straight line (L27) parallel to the optical axis (OA2) of the second laser light with the fourth face portion (14) toward the third corner portion (23) is an obtuse angle, and such that an angle (θ28) formed at an intersection point (P28) of a straight line (L28) parallel to the optical axis (OA2) of the second laser light with the first face portion (11) toward the first corner portion (21) is an obtuse angle.

This structure is capable of reducing the occurrence of insulating coating residues even when a slight amount of the insulating coating (3) is left on the vertex of each of the second corner portion (22) and the fourth corner portion (24).

The method of manufacturing the rectangular conducting wire (1) according to the first and fourth embodiments is such that the third area (Ar3) has a portion (Ar3a) overlapping a portion of the first area (Ar1) and has another portion (Ar3b) overlapping a portion of the second area (Ar2), and such that the fourth area (Ar4) has a portion (Ar4a) overlapping a portion of the second area (Ar2) and has another portion (Ar4b) overlapping a portion of the first area (Ar1).

This structure ensures thorough application of laser light in each of a boundary portion between the first area (Ar1) and the third area (Ar3), a boundary portion between the third area (Ar3) and the second area (Ar2), a boundary portion between the second area (Ar2) and the fourth area (Ar4), and a boundary portion between the fourth area (Ar4) and the first area (Ar1). Therefore, highly accurate removal of the insulating coating (3) is possible.

Further, the method of manufacturing the rectangular conducting wire (1) according to the first to sixth embodiments is such that the first area (Ar1) includes the fourth corner portion (24) and the second corner portion (22).

This structure is capable of reducing the occurrence of insulating coating residues on the second corner portion (22) and the fourth corner portion (24).

Further, the method of manufacturing the rectangular conducting wire (1) according to the first to sixth embodiments is such that the obtuse angles (θ11-θ18, θ23, θ24, θ27, θ28) are greater than or equal to 120° and less than or equal to 150°.

This structure allows angles of the two planar portions, which are irradiated in the single application step, with respect to each optical axis to be taken into account so as to balance efficiency of energy that each planar portion receives from laser light.

INDUSTRIAL APPLICABILITY

A method of manufacturing a rectangular conducting wire according to the present disclosure is applicable, for example, to a method of manufacturing a rectangular conducting wire in which an insulating coating of the rectangular conducting wire is removed by applying laser light to the insulating coating.

DESCRIPTION OF THE REFERENCE NUMERALS

1: RECTANGULAR CONDUCTING WIRE
3: INSULATING COATING
5, 6: APPLICATION UNIT
11: FIRST FACE PORTION
12: SECOND FACE PORTION
13: THIRD FACE PORTION
14: FOURTH FACE PORTION
21: FIRST CORNER PORTION
22: SECOND CORNER PORTION
23: THIRD CORNER PORTION
24: FOURTH CORNER PORTION
51, 61: FIRST APPLICATION UNIT (APPLICATION UNIT)

52, 62: SECOND APPLICATION UNIT (APPLICATION UNIT)
Ar1: FIRST AREA
Ar2: SECOND AREA
Ar3: THIRD AREA
Ar3a: PORTION OF THIRD AREA
Ar3b: ANOTHER PORTION OF THIRD AREA
Ar4: FOURTH AREA
Ar4a: PORTION OF FOURTH AREA
Ar4b: ANOTHER PORTION OF FOURTH AREA
L1, L11 to L14: STRAIGHT LINE PARALLEL TO DIRECTION OF OPTICAL AXIS OF LASER LIGHT (FIRST LASER LIGHT)
L2, L15 to L18, L23, L24, L27, L28: STRAIGHT LINE PARALLEL TO DIRECTION OF OPTICAL AXIS OF SECOND LASER LIGHT
OA1, OA2: OPTICAL AXIS
P11 to P18, P23, P24, P27, P28: INTERSECTION POINT

The invention claimed is:

1. A method of manufacturing a rectangular conducting wire in which an insulating coating of the rectangular conducting wire is removed by applying laser light to the insulating coating, wherein
four planar portions on an exterior of the rectangular conducting wire are defined in adjacent order of arrangement as a first face portion, a second face portion, a third face portion, and a fourth face portion,
a corner portion between the first face portion and the second face portion is defined as a first corner portion,
a corner portion between the second face portion and the third face portion is defined as a second corner portion,
a corner portion between the third face portion and the fourth face portion is defined as a third corner portion, and
a corner portion between the fourth face portion and the first face portion is defined as a fourth corner portion, the method comprising:
a first step of applying the laser light to a first area including the first face portion, the first corner portion, and the second face portion, with the rectangular conducting wire placed in a first position where the first face portion and the second face portion face an application unit for applying the laser light, where an angle formed at an intersection point of a straight line parallel to an optical axis of the laser light with the first face portion toward the fourth corner portion is an obtuse angle, and where an angle formed at an intersection point of a straight line parallel to the optical axis with the second face portion toward the second corner portion is an obtuse angle.

2. The method of manufacturing the rectangular conducting wire according to claim 1, further comprising:
a second step of applying the laser light to a second area including the third face portion, the third corner portion, and the fourth face portion, with the rectangular conducting wire placed in a second position where the third face portion and the fourth face portion face the application unit for applying the laser light, where an angle formed at an intersection point of a straight line parallel to the optical axis with the third face portion toward the second corner portion is an obtuse angle, and where an angle formed at an intersection point of a straight line parallel to the optical axis with the fourth face portion toward the fourth corner portion is an obtuse angle.

3. The method of manufacturing the rectangular conducting wire according to claim 2, further comprising:
a third step of applying the laser light to a third area including the second corner portion, with the rectangular conducting wire placed in a third position where the second corner portion faces the application unit for applying the laser light, where an angle formed at an intersection point of a straight line parallel to the optical axis with the second face portion toward the first corner portion is an obtuse angle, and where an angle formed at an intersection point of a straight line parallel to the optical axis with the third face portion toward the third corner portion is an obtuse angle; and
a fourth step of applying the laser light to a fourth area including the fourth corner portion, with the rectangular conducting wire placed in a fourth position where the fourth corner portion faces the application unit for applying the laser light, where an angle formed at an intersection point of a straight line parallel to the optical axis with the fourth face portion toward the third corner portion is an obtuse angle, and where an angle formed at an intersection point of a straight line parallel to the optical axis with the first face portion toward the first corner portion is an obtuse angle.

4. The method of manufacturing the rectangular conducting wire according to claim 3, wherein
the third area has a portion overlapping a portion of the first area and has another portion overlapping a portion of the second area, and
the fourth area has a portion overlapping a portion of the second area and has another portion overlapping a portion of the first area.

5. The method of manufacturing the rectangular conducting wire according to claim 3, wherein the first area includes the fourth corner portion and the second corner portion.

6. The method of manufacturing the rectangular conducting wire according to claim 2, wherein the first area includes the fourth corner portion and the second corner portion.

7. The method of manufacturing the rectangular conducting wire according to claim 2, wherein the obtuse angles are greater than or equal to 120° and less than or equal to 150°.

8. The method of manufacturing the rectangular conducting wire according to claim 1, wherein
the laser light is first laser light that is applied from a first application unit, the method further comprising:
a second step of applying second laser light different from the first laser light to a second area including the third face portion, the third corner portion, and the fourth face portion, with the rectangular conducting wire placed such that the third face portion and the fourth face portion face a second application unit for applying the second laser light, such that an angle formed at an intersection point of a straight line parallel to an optical axis of the second laser light with the third face portion toward the second corner portion is an obtuse angle, and such that an angle formed at an intersection point of a straight line parallel to the optical axis with the fourth face portion toward the fourth corner portion is an obtuse angle.

9. The method of manufacturing the rectangular conducting wire according to claim 8, further comprising:
a third step of applying the first laser light to a third area including the second corner portion, with the rectangular conducting wire placed such that the second corner portion faces the first application unit, such that an angle formed at an intersection point of a straight line parallel to the optical axis of the first laser light with the second face portion toward the first corner portion is an obtuse angle, and such that an angle formed at an intersection point of a straight line parallel to the optical axis of the first laser light with the third face portion toward the third corner portion is an obtuse angle; and a fourth step of applying the second laser light to a fourth area including the fourth corner portion, with the rectangular conducting wire placed such that the fourth corner portion faces the second application unit, such that an angle formed at an intersection point of a straight line parallel to the optical axis of the second laser light with the fourth face portion toward the third corner portion is an obtuse angle, and such that an angle formed at an intersection point of a straight line parallel to the optical axis of the second laser light with the first face portion toward the first corner portion is an obtuse angle.

10. The method of manufacturing the rectangular conducting wire according to claim 9, wherein the third area has a portion overlapping a portion of the first area and has another portion overlapping a portion of the second area, and the fourth area has a portion overlapping a portion of the second area and has another portion overlapping a portion of the first area.

11. The method of manufacturing the rectangular conducting wire according to claim 9, wherein the first area includes the fourth corner portion and the second corner portion.

12. The method of manufacturing the rectangular conducting wire according to claim 8, wherein the first area includes the fourth corner portion and the second corner portion.

13. The method of manufacturing the rectangular conducting wire according to claim 12, wherein the obtuse angles are greater than or equal to 120° and less than or equal to 150°.

14. The method of manufacturing the rectangular conducting wire according to claim 8, wherein the obtuse angles are greater than or equal to 120° and less than or equal to 150°.

15. The method of manufacturing the rectangular conducting wire according to claim 1, wherein the first area includes the fourth corner portion and the second corner portion.

16. The method of manufacturing the rectangular conducting wire according to claim 15, wherein the obtuse angles are greater than or equal to 120° and less than or equal to 150°.

17. The method of manufacturing the rectangular conducting wire according to claim 1, wherein the obtuse angles are greater than or equal to 120° and less than or equal to 150°.

* * * * *